(12) United States Patent
Na et al.

(10) Patent No.: US 12,346,164 B2
(45) Date of Patent: Jul. 1, 2025

(54) ELECTRONIC DEVICE

(71) Applicant: Samsung Display Co., Ltd., Yongin-si (KR)

(72) Inventors: Hyunjae Na, Yongin-si (KR); Hirotsugu Kishimoto, Yongin-si (KR); Yong-Kwan Kim, Yongin-si (KR); Sungguk An, Yongin-si (KR); Seokwon Jang, Yongin-si (KR); Chul Ho Jeong, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 69 days.

(21) Appl. No.: 18/505,119

(22) Filed: Nov. 9, 2023

(65) Prior Publication Data
US 2024/0160246 A1    May 16, 2024

(30) Foreign Application Priority Data

Nov. 10, 2022  (KR) .................... 10-2022-0149815

(51) Int. Cl.
| | |
|---|---|
| G06F 1/16 | (2006.01) |
| G06F 3/046 | (2006.01) |
| H01F 5/02 | (2006.01) |
| H01F 5/04 | (2006.01) |

(52) U.S. Cl.
CPC .......... *G06F 1/1641* (2013.01); *G06F 1/1616* (2013.01); *G06F 1/1643* (2013.01); *G06F 1/1652* (2013.01); *G06F 1/1658* (2013.01); *G06F 3/046* (2013.01); *H01F 5/02* (2013.01); *H01F 5/04* (2013.01); *G06F 2200/1635* (2013.01); *G06F 2203/04102* (2013.01)

(58) Field of Classification Search
CPC ........... G06F 2203/04102; G06F 3/046; G06F 1/1652; G06F 3/0446; G06F 3/0412; G06F 1/1643; G06F 1/1641; G06F 2200/1635; G06F 1/1618; G06F 2203/04107
See application file for complete search history.

(56) References Cited

U.S. PATENT DOCUMENTS

| | | | |
|---|---|---|---|
| 11,132,020 B2* | 9/2021 | Kim ...................... | G06F 1/1677 |
| 2014/0362012 A1* | 12/2014 | Lee ......................... | G06F 3/046 |
| | | | 345/173 |
| 2017/0194409 A1* | 7/2017 | Jeong ................... | H10D 86/411 |

(Continued)

*Primary Examiner* — Dismery Mercedes
(74) *Attorney, Agent, or Firm* — KILE PARK REED & HOUTTEMAN PLLC

(57) ABSTRACT

An electronic device includes a display panel including a folding area and first and second non-folding areas spaced apart from each other with the folding area between the first and second non-folding areas, and a digitizer including a first non-folding portion overlapping the first non-folding area, a second non-folding portion overlapping the second non-folding area, and a folding portion overlapping the folding area and including holes. The digitizer includes first loop coils in a first direction and second loop coils in a second direction and insulated from and intersecting with the first loop coils. The second loop coils may include non-folding coils respectively in the first and second non-folding portions and folding coils, at least one of which is in the folding portion. The non-folding coils are driven in a first mode, and the folding coils are driven in a second mode.

30 Claims, 17 Drawing Sheets

(56) References Cited

U.S. PATENT DOCUMENTS

| | | | |
|---|---|---|---|
| 2017/0212637 A1* | 7/2017 | Choi | G06F 3/0445 |
| 2019/0033919 A1* | 1/2019 | Hirakata | G06F 3/0412 |
| 2019/0064958 A1* | 2/2019 | Liu | G06F 3/0446 |
| 2021/0173437 A1* | 6/2021 | Bae | H10K 59/40 |
| 2021/0357048 A1* | 11/2021 | Kishimoto | H10K 59/40 |
| 2021/0407344 A1* | 12/2021 | Lee | H10K 59/131 |
| 2022/0091632 A1 | 3/2022 | Hong et al. | |
| 2022/0091689 A1 | 3/2022 | Kishimoto et al. | |
| 2022/0310752 A1* | 9/2022 | Liu | H10K 59/131 |

\* cited by examiner

ELECTRONIC DEVICE

CROSS-REFERENCE TO RELATED APPLICATIONS

This application claims priority to and benefits of Korean Patent Application No. 10-2022-0149815 under 35 U.S.C. § 119 filed on Nov. 10, 2022, in the Korean Intellectual Property Office, the entire contents of which are incorporated herein by reference.

BACKGROUND

1. Technical Field

Embodiments described herein relate to an electronic device, and, to an electronic device including a digitizer.

2. Description of the Related Art

In the information society, the importance of electronic devices is emerging as visual information delivery media. The electronic device is activated by receiving an electrical signal. The electronic device may include a display layer that displays an image and a digitizer that detects an input applied from the outside.

A digitizer for the electronic device may include various sensing coils to be activated by an electrical signal. An area where the sensing coils are activated responds to a signal applied from the outside.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Embodiments disclosure provide an electronic device with improved sensing sensitivity in a folding area.

The technical objectives to be achieved by the disclosure are not limited to those described herein, and other technical objectives that are not mentioned herein would be clearly understood by a person skilled in the art from the description of the disclosure.

According to an embodiment, an electronic device may include a display panel including a folding area to be folded along a folding axis extending in a first direction; and a first non-folding area and a second non-folding area spaced apart from each other in a second direction intersecting with the first direction with the folding area disposed between the first non-folding area and the second non-folding area; and a digitizer including a first non-folding portion at least partially overlapping the first non-folding area in a plan view; a second non-folding portion at least partially overlapping the second non-folding area in a plan view; and a folding portion at least partially overlapping the folding area in a plan view, connecting the first non-folding portion and the second non-folding portion and including holes, including first loop coils disposed in the first direction and second loop coils disposed in the second direction and insulated from and intersecting with the first loop coils, and disposed below the display panel. The second loop coils may include non-folding coils respectively disposed in the first non-folding portion and the second non-folding portion, and folding coils, at least one of the folding coils being disposed in the folding portion. The non-folding coils may be driven in a first mode, and the folding coils may be driven in a second mode different from the first mode.

The folding coils may include a first folding coil at least partially overlapping the folding area in a plan view and driven in a multi-channel; a second folding coil at least partially overlapping the first non-folding area in a plan view and insulated from and intersecting with the first folding coil; and a third folding coil at least partially overlapping the second non-folding area in a plan view and insulated from and intersecting with the first folding coil. The first folding coil and the second folding coil may be driven as one first channel, and the first folding coil and the third folding coil may be driven as a second channel different from the first channel.

The first folding coil may output a pre-sensing signal, and the second loop coils may receive a mode determination signal for selecting one of the first mode and the second mode based on the pre-sensing signal. The mode determination signal may be selected as the first mode in case that an input in the first folding coil is not detected through the pre-sensing signal, and the mode determination signal may be selected as the second mode in case that an input in the first folding coil is detected through the pre-sensing signal.

The first loop coils may be driven in both the first mode and the second mode.

Each of the non-folding coils may include an open loop wound twice, and each of the folding coils may include an open loop wound once.

The digitizer may include a base layer; a first cover layer disposed on the base layer; a second cover layer disposed below the base layer; and a third cover layer disposed below the second cover layer.

Each of the first loop coils may include a first coil portion and a first connection portion connecting the first coil portion and a connector; and the first coil portion may include first long sides extending in the second direction and first short sides extending in the first direction. The first long sides may be disposed on the base layer and covered by the first cover layer, and the first short sides may be disposed below the base layer and covered by the second cover layer, and at least a portion of the first connection portion may be disposed below the second cover layer and covered by the third cover layer.

Each of the non-folding coils may include a second coil portion and a second connection portion connecting the second coil portion and a connector, and the second coil portion may include second long sides extending in the first direction and second short sides extending in the second direction. The second long sides may be disposed below the base layer and covered by the second cover layer, and the second short sides are disposed on the base layer and covered by the first cover layer, and at least a portion of the second connection portion may be disposed below the second cover layer and covered by the third cover layer.

The folding coils may include a first folding coil at least partially overlapping the folding area in a plan view, a second folding coil at least partially overlapping the first non-folding area in a plan view and insulated from and intersecting with the first folding coil, and a third folding coil at least partially overlapping the second non-folding area in a plan view and insulated from and intersecting with the first folding coil, wherein the first folding coil may include a 3-1-th coil portion including 3-1-th long sides extending in the first direction and 3-1-th short sides extending in the second direction. The second folding coil may include a 3-2-th coil portion including 3-2-th long sides extending in the first direction and 3-2-th short sides extending in the second direction. The third folding coil may include a 3-3-th coil portion including 3-3-th long sides extending in the first direction and 3-3-th short sides extending in the second direction. The 3-1-th to 3-3-th long sides may be disposed below the base layer and covered by the first cover layer, and the 3-1-th to 3-3-th short sides may be disposed below the first cover layer and covered by the second cover layer.

The 3-1-th short sides may be disposed between adjacent holes adjacent to cross the folding portion.

Each of the 3-1-th long sides may be disposed in the folding portion.

One of the 3-1-th long sides may be disposed in the first non-folding portion, and another of the 3-1-th long sides may be disposed in the second non-folding portion.

One of the 3-2-th long sides may be disposed in the first non-folding portion, and one of the 3-3-th long sides may be disposed in the second non-folding portion.

Another of the 3-2-th long sides may be disposed in one of the folding portion and the second non-folding portion, and another of the 3-3-th long sides may be disposed in one of the folding portion and the first non-folding portion.

A portion of the 3-2-th short sides and a portion of the 3-3-th short sides may be disposed between adjacent holes.

Another of the 3-2-th long sides may be disposed in the first non-folding portion, and another of the 3-3-th long sides may be disposed in the second non-folding portion.

The first folding coil may further include a 3-1-th connection portion connecting the 3-1-th coil portion and a connector, the second folding coil may further include a 3-2-th connection portion connecting the 3-2-th coil portion and the connector, and the third folding coil may further include a 3-3-th connection portion connecting the 3-3-th coil portion and the connector. At least a portion of each of the 3-1-th to 3-3-th connection portions may be disposed below the second cover layer and covered by the third cover layer.

The holes may be formed by penetrating from the first cover layer to the third cover layer.

The base layer may include a matrix including a filler and a reinforced fiber composite material disposed within the matrix and including any one of reinforced fibers and carbon fibers.

The matrix may include at least one of epoxy, polyester, polyamides, polycarbonates, polypropylene, polybutylene, and vinyl ester, and the filler may include at least one of silica, barium sulphate, sintered talc, barium titanate, titanium oxide, clay, alumina, mica, boehmite, zinc borate, and zinc tin oxide.

The holes may include a first group hole and a second group hole each extending in the first direction and spaced apart from each other along the second direction, and the second group hole may be shifted from the first group hole by a selectable distance in the first direction.

The digitizer may detect an external input using electromagnetic resonance.

According to an embodiment, an electronic device may include a display panel including a folding area to be folded along a folding axis extending in a first direction; and a first non-folding area and a second non-folding area spaced apart from each other in a second direction intersecting with the first direction with the folding area disposed between the first non-folding area and the second non-folding area; and a digitizer including first loop coils disposed in the first direction and second loop coils disposed in the second direction and insulated from and intersecting with the first loop coils; and having holes at least partially overlapping the folding area in a plan view, and disposed below the display panel. The second loop coils may include non-folding coils including a first non-folding coil at least partially overlapping the first non-folding area in a plan view and a second non-folding coil at least partially overlapping the second non-folding area in a plan view, and folding coils including a first folding coil at least partially overlapping the folding area in a plan view, a second folding coil at least partially overlapping the first non-folding area in a plan view and insulated from and intersecting with the first folding coil and a third folding coil at least partially overlapping the second non-folding area in a plan view and insulated from and intersecting with the first folding coil. Each of the non-folding coils may include an open loop wound twice, and each of the folding coils may include an open loop wound once.

Each of the first folding coil, the second folding coil and the third folding coil may include a first sub long side and a second sub long side each extending in the first direction and facing each other in the second direction, and a first sub short side and a second sub short side extending in the second direction, facing in the first direction, and connecting the first sub long side and the second sub long side. The first sub long side and the second sub long side and the first sub short side and the second sub short side may be disposed on different layers.

The non-folding coils may include a first non-folding long side, a second non-folding long side, a third non-folding long side, a fourth non-folding long side and a fifth non-folding long side each extending in the first direction and disposed in the second direction, and a first non-folding short side, a second non-folding short side, a third non-folding short side and a fourth non-folding short side each extending in the second direction and disposed in the first direction, and the first non-folding long side, the first non-folding short side, the second non-folding long side, the second non-folding short side, the third non-folding long side, the third non-folding short side, the fourth non-folding long side, the fourth non-folding short side, and the fifth non-folding long side may be sequentially connected.

The first sub long side, the second sub long side, the first non-folding long side, the second non-folding long side, the third non-folding long side, the fourth non-folding long side and the fifth non-folding long side may be disposed on a same layer, and the first non-folding short side, the second non-folding short side, the third non-folding short side, and the fourth non-folding short side may be disposed on different layers from the first sub short side and the second sub short side.

The digitizer may include a base layer; a first cover layer disposed on the base layer; a second cover layer disposed below the base layer; and a third cover layer disposed below the second cover layer. The first sub long side and the second sub long side may be disposed below the base layer and covered by the second cover layer, the first sub short side and the second sub short side may be disposed below the second cover layer and covered by the third cover layer, and the first sub long side and the second sub long side may be connected to the first sub short side and the second sub short side by contact holes passing through the second cover layer.

The first non-folding long side, the second non-folding long side, the third non-folding long side, the fourth non-folding long side and the fifth non-folding long side may be disposed below the base layer and covered by the second cover layer, the first non-folding short side, the second non-folding short side, the third non-folding short side and the fourth non-folding short side may be disposed on the base layer and covered by the first cover layer, and the first non-folding long side, the second non-folding long side, the third non-folding long side, the fourth non-folding long side and the fifth non-folding long side may be connected to the first non-folding short side, the second non-folding short side, the third non-folding short side, and the fourth non-folding short side by contact holes passing through the base layer.

The digitizer may be driven in a first mode and a second mode, and the first loop coils and the non-folding coils may output a sensing signal in the first mode, and the first loop coils and the folding coils may output a sensing signal in the second mode.

The first folding coil may be driven in a multi-channel. The first folding coil and the second folding coil may be driven as a first channel; and the first folding coil and the third folding coil may be driven as a second channel different from the first channel.

BRIEF DESCRIPTION OF THE DRAWINGS

The above and other objects and features of the disclosure will become apparent by describing in detail embodiments thereof with reference to the accompanying drawings in which.

DETAILED DESCRIPTION OF THE EMBODIMENTS

Figure 1A:
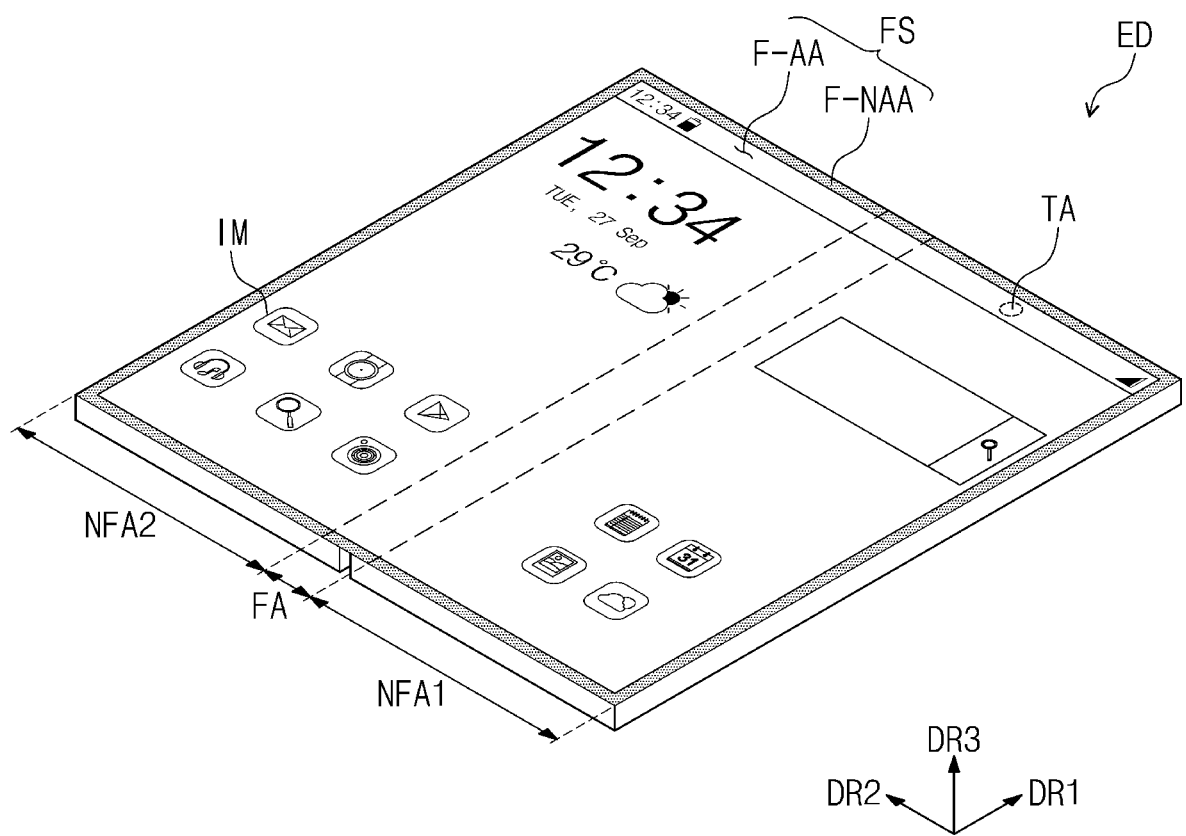
FIGS. 1A to 1C are schematic perspective views of an electronic device according to an embodiment.

The disclosure will now be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present.

Like numbers refer to like elements throughout. Also, in the drawings, the thickness, ratio, and dimensions of elements may be exaggerated for effective description of technical content.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

Terms such as first and/or second may be used to describe various elements, but the elements should not be limited by the terms. The terms are used for the purpose to distinguish a component from the other component. For example, without departing the scope of the disclosure, a first component may be referred to as a second component, and similarly, a second component may be referred to as a first component.

As used herein, the singular forms, "a," "an," and "the" are intended to include the plural forms as well, unless the context clearly indicates otherwise.

Terms such as "under", "lower", "over", "upper" are used to describe the positioning of components shown in the drawings. The above terms are relative concepts and are described based on the direction shown in the drawing but are not limited thereto.

It will be further understood that the terms "comprises," "comprising," "includes," and/or "including,", "has," "have," and/or "having," and variations thereof when used in this specification, specify the presence of stated features, integers, steps, operations, elements, components, and/or groups thereof, but do not preclude the presence or addition of one or more other features, integers, steps, operations, elements, components, and/or groups thereof.

For the purposes of this disclosure, the phrase "at least one of A and B" may be construed as A only, B only, or any combination of A and B. Also, "at least one of X, Y, and Z" and "at least one selected from the group consisting of X, Y, and Z" may be construed as X only, Y only, Z only, or any combination of two or more of X, Y, and Z. The term "overlap" or "overlapped" means that a first object may be above or below or to a side of a second object, and vice versa.

Additionally, the term "overlap" may include layer, stack, face or facing, extending over, covering, or partly covering or any other suitable term as would be appreciated and understood by those of ordinary skill in the art. The expression "not overlap" may include meaning such as "apart from" or "set aside from" or "offset from" and any other suitable equivalents as would be appreciated and understood by those of ordinary skill in the art. The terms "face" and "facing" may mean that a first object may directly or indirectly oppose a second object. In a case in which a third object intervenes between a first and second object, the first and second objects may be understood as being indirectly opposed to one another, although still facing each other.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined or implied herein, all terms (including technical and scientific terms) used herein have the same meaning as commonly understood by one of ordinary skill in the art to which the disclosure pertains. It is also to be understood that terms defined in commonly used dictionaries should be interpreted as having meanings consistent with the meanings in the context of the related art, and are expressly defined herein and should not be interpreted in an ideal or overly formal sense unless so defined or implied herein.

Hereinafter, the disclosure will be described with reference to the accompanying drawings.

Figure 1B:
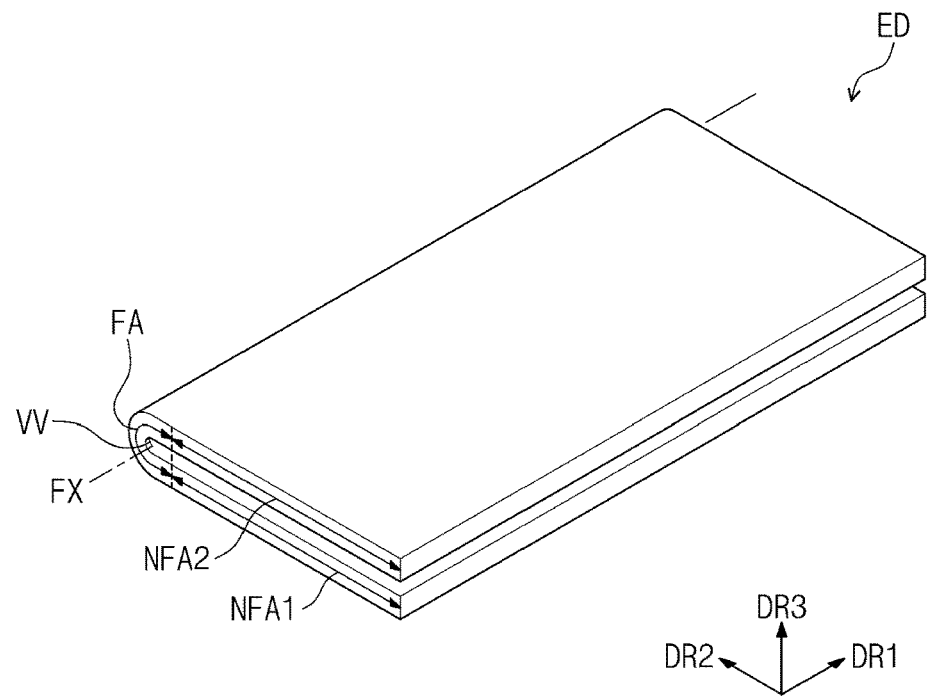
Figure 1C:
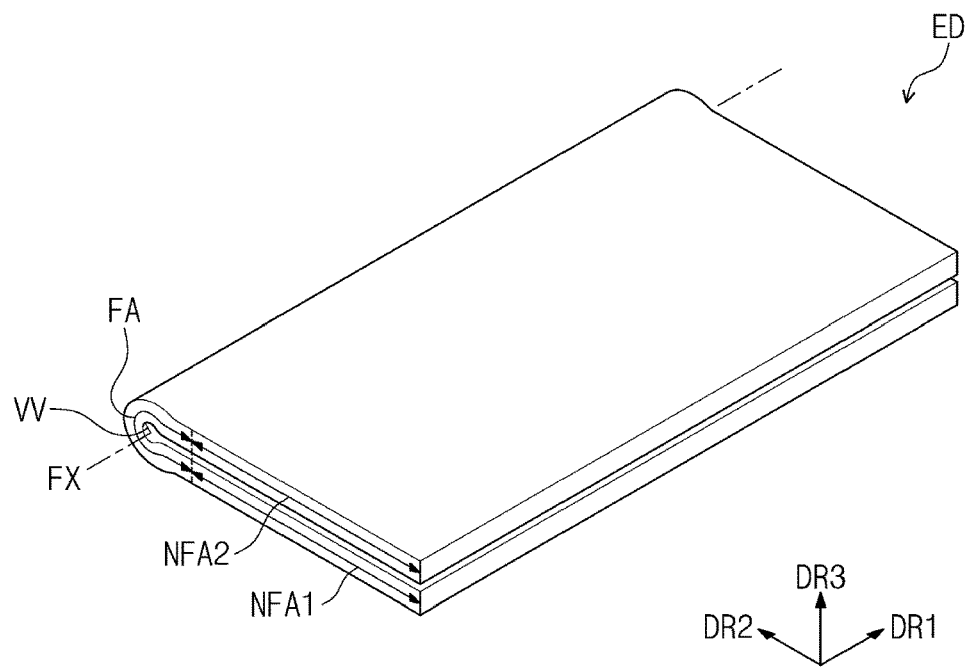

FIGS. 1A to 1C are perspective views of an electronic device according to an embodiment. FIG. 1A shows an unfolded state of an electronic device ED, and FIGS. 1B and 1C show a folded state of an electronic device ED.

Referring to FIGS. 1A to 1C, the electronic device ED according to an embodiment may include a display surface FS defined by a first direction DR1 and a second direction DR2 crossing the first direction DR1. The electronic device ED may provide an image IM to a user through the display surface FS.

The display surface FS may include an active area F-AA and a peripheral area F-NAA. The peripheral area F-NAA may be adjacent to the active area F-AA. The peripheral area F-NAA may have a lower light transmittance than the active area F-AA and have a selectable color.

According to this embodiment, the peripheral area F-NAA may surround or may be adjacent to the active area F-AA. Accordingly, the shape of the active area F-AA may be substantially defined by the peripheral area F-NAA. However, this is shown as an example, and the peripheral area F-NAA may be disposed exclusively adjacent to one side of the active area F-AA or may be omitted.

The display surface FS may include a sensing area TA. The sensing area TA may be a partial area of the active area F-AA. The sensing area TA may have a higher light transmittance than other areas of the active area F-AA. Hereinafter, other areas of the active area F-AA except for the sensing area TA may be defined as general display areas.

An optical signal, for example, visible light or infrared light, may travel to the sensing area TA. The electronic device ED may capture an external image through visible light passing through the sensing area TA or determine the proximity of an external object through infrared light. Although one sensing area TA is illustrated as an example in FIG. 1A, sensing areas TA may be provided without being limited thereto.

Hereinafter, a direction substantially perpendicular to the plane defined by the first direction DR1 and the second direction DR2 may be defined as a third direction DR3. The third direction DR3 serves as a reference for distinguishing the front and rear surfaces of each member. In this specification, "on a plane" may be defined as being viewed in the third direction DR3.

The electronic device ED may include a folding area FA and non-folding areas NFA1 and NFA2. The non-folding areas NFA1 and NFA2 may include the first non-folding area NFA1 and the second non-folding area NFA2. The first non-folding area NFA1 and the second non-folding area NFA2 may be spaced apart in the second direction DR2 with the folding area FA interposed therebetween.

As shown in FIG. 1B, the folding area FA may be folded around a folding axis FX parallel to the first direction DR1. The folding area FA may have a selectable curvature and a radius of curvature VV. A distance between the first non-folding area NFA1 and the second non-folding area NFA2 may be substantially equal to twice the radius of curvature VV. According to an embodiment, the first non-folding area NFA1 and the second non-folding area NFA2 may face each other, and the electronic device ED may be folded in an in-folding method such that the display surface FS is not exposed to the outside.

As shown in FIG. 1C, the distance between the first non-folding area NFA1 and the second non-folding area NFA2 may be smaller than twice the radius of curvature VV. Accordingly, a separation distance between the first non-folding area NFA1 and the second non-folding area NFA2 may be reduced in the folded state, thereby providing the electronic device ED which is slim in case that being in the folded state. The electronic device ED may be regarded as having a dumbbell shape in a folded state.

However, it is not limited thereto, and in one embodiment, the electronic device ED may be out-folded such that the display surface FS is exposed to the outside. In one embodiment, the electronic device ED may be configured such that an in-folding or out-folding operation is repeated from an unfolding operation, but is not limited thereto. In one embodiment, the electronic device ED may be configured to select any one of an unfolding operation, an in-folding operation, and an out-folding operation.

Figure 2:
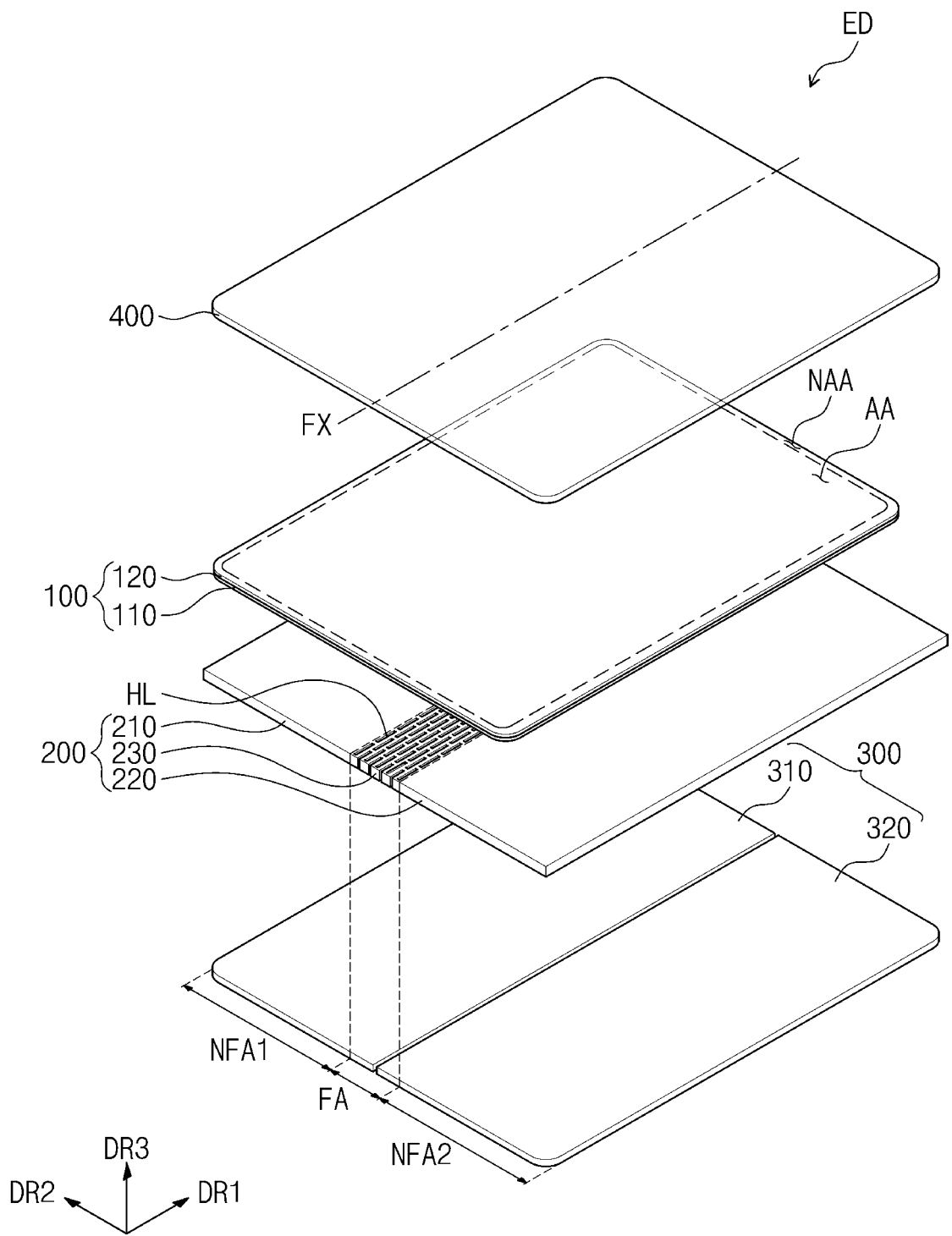
FIG. 2 is an exploded perspective view of an electronic device according to an embodiment.
Figure 3:
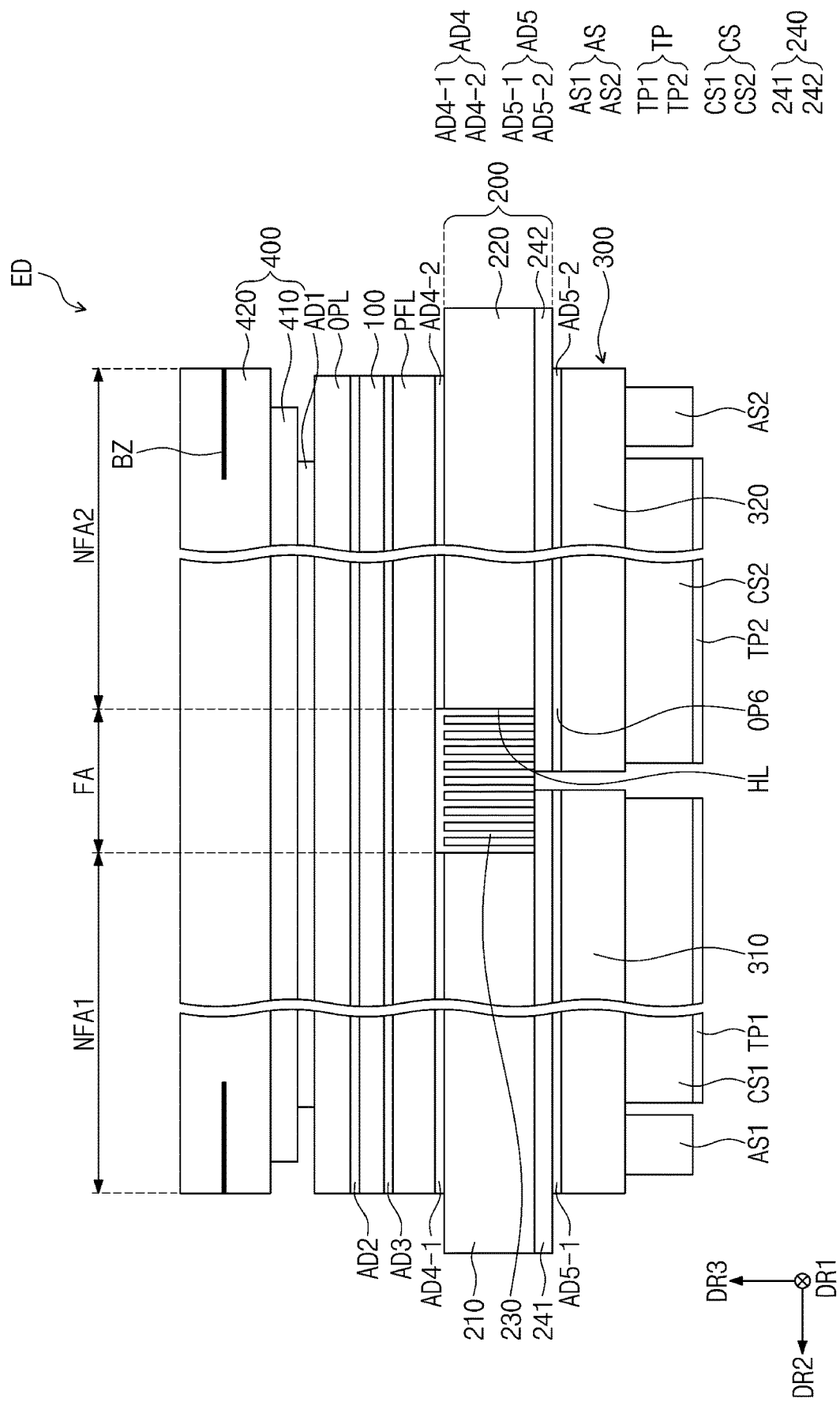
FIG. 3 is a schematic cross-sectional view of an electronic device according to an embodiment.

FIG. 2 is an exploded schematic perspective view of an electronic device according to an embodiment. FIG. 3 is a schematic cross-sectional view of an electronic device according to an embodiment. FIG. 2 shows components included in the electronic device ED.

Referring to FIGS. 2 and 3, the electronic device ED may include a display module 100, a digitizer 200, a cushion layer 300, and a window 400. By way of example, the electronic device ED may include adhesive layers AD1 to AD5, upper functional layers disposed between the display module 100 and the window 400, and lower functional layers disposed under (or below) the digitizer 200.

The adhesive layers AD1 to AD5 to be described below may include any one of optical clear adhesive (OCA), optical clear resin (OCR), and pressure sensitive adhesive (PSA).

The display module 100 may be flexible. An active area AA of the display module 100 may correspond to the active area F-AA of the electronic device ED shown in FIG. 1A, and a peripheral area NAA of the display module 100 may correspond to the peripheral area F-NAA of the electronic device ED.

The display module 100 may include a display panel 110 that displays an image and an input sensor 120 that detects an external input. The display panel 110 may be the light emitting display panel 110 and is not particularly limited. For example, the display panel 110 may be an organic light emitting display panel or an inorganic light emitting display panel. A light emitting element of the organic light emitting display panel may include an organic light emitting material. A light emitting element of the inorganic light emitting display panel may include a quantum dot, a quantum rod or the like within the spirit and the scope of the disclosure. Also, the display panel 110 according to an embodiment may include a micro LED element and/or a nano LED element, and is not particularly limited.

The display panel 110 may include pixels each including one of the light emitting elements described above. Light emitting layers included in each light emitting element may be disposed in the active area AA and emit light of selectable colors. In case that light emitting layers are provided, the light emitting elements may correspond to the light emitting layers, respectively. By way of example, in case that a single light emitting layer is provided, color filters or color conversion members disposed on the light emitting layer may be further included.

The input sensor 120 may be disposed on the display panel 110. The input sensor 120 may be driven in a capacitive manner. The input sensor 120 may detect a location and/or strength of a touch by a user's hand over the entire active area F-AA. The input sensor 120 may include sensing electrodes insulated from each other, routing wires connected to corresponding sensing electrodes, and at least one sensing insulating layer.

The input sensor 120 according to an embodiment may be formed on the display panel 110 through consecutive processes. The input sensor 120 may be expressed as being 'directly disposed' on the display panel 110. Being directly disposed may mean that a third component is not disposed between the input sensor 120 and the display panel 110. For example, a separate adhesive member may not be disposed between the input sensor 120 and the display panel 110.

However, the disclosure is not limited thereto, and the input sensor 120 may be provided as a separate module and bonded to the display panel 110 through an adhesive layer.

The digitizer 200 may be disposed under the display module 100. The digitizer 200 according to the disclosure may detect an input by an electromagnetic pen. The digitizer 200 may be driven in a method using Electro Magnetic Resonance (EMR).

The digitizer 200 may be disposed under the display module 100 to support the display module 100. The digitizer 200 may include a first non-folding portion 210, a second non-folding portion 220, and a folding portion 230. The digitizer 200 may further include a shielding layer 240.

The first non-folding portion 210 may overlap at least a portion of the first non-folding area NFA1. The second non-folding portion 220 may overlap at least a portion of the second non-folding area NFA2. The folding portion 230 may overlap the folding area FA. Accordingly, the folding portion 230 may be disposed between the first non-folding portion 210 and the second non-folding portion 220.

Holes HL passing through the folding portion 230 of the digitizer 200 in the third direction DR3 may be defined in the folding portion 230 of the digitizer 200 according to the disclosure. The holes HL correspond to the folding area FA and may be spaced apart from one another in the first direction DR1 and the second direction DR2. As the holes HL are defined in the folding portion 230 of the digitizer 200, the shape of the digitizer 200 may be readily deformed in case that the electronic device ED is folded. Components included in the digitizer 200 will be described later.

The shielding layer 240 may include a first shielding layer 241 and a second shielding layer 242. The first shielding layer 241 may overlap a portion of the folding portion 230 and the first non-folding portion 210, and the second shielding layer 242 may overlap another portion of the folding portion 230 and the second non-folding portion 220. The first shielding layer 241 and the second shielding layer 242 may be spaced apart from each other within the folding area FA along the first direction DR1. However, the disclosure is not limited thereto, and the shielding layer 240 may be disposed on the entire folding area FA to cover the holes HL.

In one embodiment, the shielding layer 240 may include metal. For example, the shielding layer 240 may include magnetic metal powder (MMP). However, the material of the shielding layer 240 is not limited thereto, and may include any one of permalloy that is alloy of nickel (Ni) and iron (Fe), invar, and stainless steel.

According to an embodiment, in case that the electronic device ED is folded, the shape of the display module 100 may be deformed to substantially correspond to the shape of the digitizer 200.

In the digitizer 200 according to an embodiment, a base layer on which sensing coils are to be disposed may include a reinforced fiber composite material. The digitizer 200 may include reinforced fibers disposed within a matrix portion. The reinforced fibers may be carbon fibers or glass fibers. The matrix portion may include a polymer resin. The matrix portion may include a thermoplastic resin. The sensing coils may include sensing coils disposed on the front and rear surfaces of the base layer and insulated from each other. For example, the digitizer 200 according to the disclosure may simultaneously a function as a protection member and a function as a sensing member for detecting an input of an electromagnetic pen. A detailed description of the functions of the protection member and the sensing member of the digitizer 200 will be described later.

The cushion layer 300 may be disposed under the digitizer 200. The cushion layer 300 may protect the display module 100 from shock transferred under the display module 100. The cushion layer 300 may include foam or sponge. The foam may include polyurethane foam or thermoplastic polyurethane foam. In case that the cushion layer 300 may include foam, the cushion layer 300 may further include a barrier film as a base layer, and the cushion layer 300 may be formed by applying a foaming agent on the barrier film.

The cushion layer 300 may include a first cushion layer 310 overlapping a portion of the folding portion 230 and the first non-folding portion 210 and a second cushion layer 320 overlapping another portion of the folding portion 230 and the second non-folding portion 220. The first cushion layer 310 and the second cushion layer 320 may be spaced apart from each other in the second direction DR2 within the folding area FA.

The first cushion layer 310 and the second cushion layer 320 may prevent foreign substances from entering the holes HL defined in the folding portion 230 in case that the electronic device ED is in an unfolded state. Although the folding portion 230 is folded with a selectable curvature in case that the electronic device ED is in a folded state, the first cushion layer 310 and the second cushion layer 320 may be spaced apart from each other in a region in which the first cushion layer 310 and the second cushion layer 320 overlap the folding portion 230, facilitating deformation of the shape of the digitizer 200.

The window 400 may be disposed on the display module 100. The window 400 may include an optically transparent material to allow light provided from the display module 100 to pass through the window 400. The window 400 may provide a display surface FS (see FIG. 1A) of the electronic device ED.

The window 400 may include a first layer 410, a second layer 420, and a bezel pattern BZ. The first layer 410 may include glass.

The second layer 420 may be disposed on the first layer 410. The second layer 420 may include a material having a relatively low modulus compared to the first layer 410. For example, the second layer 420 may be a film containing an organic material. The second layer 420 may have a relatively higher thickness than the first layer 410. Accordingly, the second layer 420 may protect an upper surface of the first layer 410.

The second layer 420 may include at least one functional layer. The functional layer may include at least one of a window protection layer, an anti-fingerprint layer, and an anti-reflection layer.

The window 400 may transmit an image from the display module 100 and at the same time alleviate external impact, thereby preventing the display module 100 from being damaged or malfunctioning due to external impact.

In one embodiment, the window 400 may include a thin glass or synthetic resin film. In case that the window 400 may include thin glass, a thickness of the window 400 may be about 100 µm or less. For example, the thickness of the window 400 may be about 30 µm, but is not limited thereto.

In case that the window 400 may include a synthetic resin film, the window 400 may include a polyimide (PI) film or a polyethylene terephthalate (PET) film.

The window 400 may have a multi-layer structure or a single-layer structure. For example, the window 400 may include synthetic resin films bonded together by an adhesive, or may include a glass substrate and a synthetic resin film bonded together by an adhesive.

The window 400 may be made of a flexible material. Accordingly, the window 400 may be folded or unfolded around the folding axis FX. For example, in case that the electronic device ED is folded, the shape of the window 400 may also be deformed in correspondence with the digitizer 200.

An optical layer OPL may be disposed between the display module 100 and the window 400. The optical layer OPL may be bonded to the window 400 via the first adhesive layer AD1, and the optical layer OPL may be bonded to the display module 100 via the second adhesive layer AD2.

The optical layer OPL may reduce reflectivity of external light. The optical layer OPL may include a stretchable synthetic resin film. For example, the optical layer OPL may be provided by dyeing a polyvinyl alcohol film (PVA Film) with iodine compound. By way of example, the optical layer OPL may include a color filter. The optical layer OPL may include various layers as long as the optical layer OPL is able to reduce the reflectivity of external light, and is not limited to one embodiment.

A panel protection layer PFL may be disposed between the display module 100 and the digitizer 200. The panel protection layer PFL and the display module 100 may be bonded by the third adhesive layer AD3. The panel protection layer PFL may be disposed under the display module 100 to protect a lower portion of the display module 100. The panel protection layer PFL may include a flexible plastic material. For example, the panel protection layer PFL may include polyethylene terephthalate.

The digitizer 200 and the panel protection layer PFL may be bonded by the fourth adhesive layer AD4. The fourth adhesive layer AD4 may include a first portion AD4-1 and a second portion AD4-2. The first portion AD4-1 and the second portion AD4-2 may be spaced apart from each other with the folding area FA interposed therebetween.

The first portion AD4-1 may bond the first non-folding portion 210 and a part of the panel protection layer PFL, and the second portion AD4-2 may bond the second non-folding portion 220 and another part of the panel protection layer PFL.

The electronic device ED may further include a metal plate CS, an insulating layer TP, and a step compensating member AS disposed under the cushion layer 300. The metal plate CS may protect the display module 100 by absorbing external impact. The metal plate CS may include stainless steel. The metal plate CS may include a first metal layer CS1 and a second metal layer CS2. The first metal layer CS1 may be bonded to the first cushion layer 310, and the second metal layer CS2 may be bonded to the second cushion layer 320.

The insulating layer TP may be disposed under the metal plate CS. The insulating layer TP may prevent static electricity from flowing into the metal plate CS. The insulating layer TP may be an insulating film. The insulating layer TP may be provided as a first insulating layer TP1 and a second insulating layer TP2 which are bonded to the first metal layer CS1 and the second metal layer CS2, respectively.

The step compensating member AS may be bonded to the lower side of the cushion layer 300. The step compensating member AS may be a double-sided tape or an insulating film. The step compensating member AS may be provided as a first step compensating member AS1 and a second step compensating member AS2 which are bonded to the first cushion layer 310 and the second cushion layer 320, respectively.

In the electronic device ED according to an embodiment, at least one of the metal plate CS, the insulating layer TP, and the step compensating member AS may be omitted, and is not limited to one embodiment.

Figure 4:
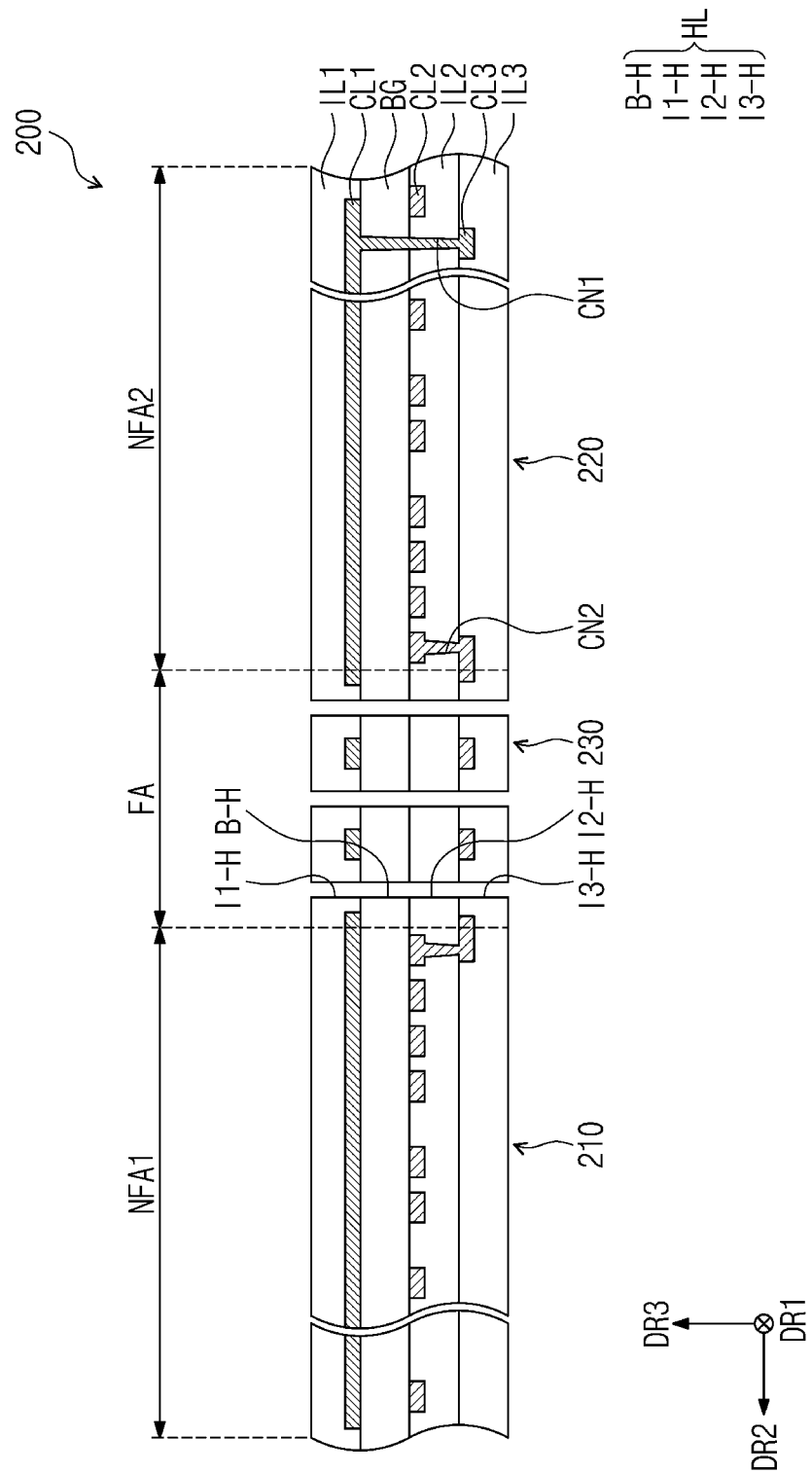
FIG. 4 is a schematic cross-sectional view of a digitizer according to an embodiment.

Referring to FIG. 4, the digitizer 200 according to an embodiment may include a base layer BG, first to third cover layers IL1, IL2, and IL3, and first to third conductive layers CL1, CL2, and CL3.

The first cover layer IL1 may be disposed on the base layer BG, the second cover layer IL2 may be disposed under the base layer BG, and the third cover layer IL3 may be disposed under the second cover layer IL2. In one embodiment, the first to third cover layers IL1, IL2, and IL3 may include the same material or a similar material as the base layer BG.

The first conductive layer CL1 may be disposed on the base layer BG and may be covered by the first cover layer ILL The second conductive layer CL2 may be disposed under the base layer BG and may be covered by the second cover layer IL2. The third conductive layer CL3 may be disposed under the second cover layer IL2 and may be covered by the third cover layer IL3.

The digitizer 200 according to an embodiment may include first loop coils XL (see FIG. 5A) and second loop coils YL (see FIG. 6A), which will be described later, and the first loop coils XL (FIG. 5A) and the second loop coils YL (see FIG. 6A) may be provided respectively as combinations of elements disposed on the first to third conductive layers CL1, CL2, and CL3. The elements disposed on different layers may be electrically connected to one another through contact holes CN1 and CN2 penetrating the cover layers IL1, IL2, and IL3 disposed between the elements.

A base hole B-H penetrating from the front surface to the rear surface of the base layer BG may be defined in the base layer BG. A first cover hole I1-H penetrating from the front surface to the rear surface of the first cover layer IL1 is defined in the first cover layer IL1, and a second cover hole I2-H penetrating from the front surface to the rear surface of the second cover layer IL2 is defined in the second cover layer IL2 and a third cover hole I3-H penetrating from the front surface to the rear surface of the third cover layer IL3 may be defined in the third cover layer IL3.

Each of the holes HL defined in the folding portion 230 may be formed in such a way that the first cover hole I1-H, the base hole B-H, the second cover hole I2-H, and the third cover hole I3-H are aligned with one another in the third direction DR3. As the first cover hole I1-H, the base hole B-H, the second cover hole I2-H, and the third cover hole I3-H are formed by the same processing, the inner surfaces of the first cover hole I1-H, the base hole B-H, the second cover hole I2-H, and the third cover hole I3-H may be aligned with one another in the third direction DR3.

Figure 5A:
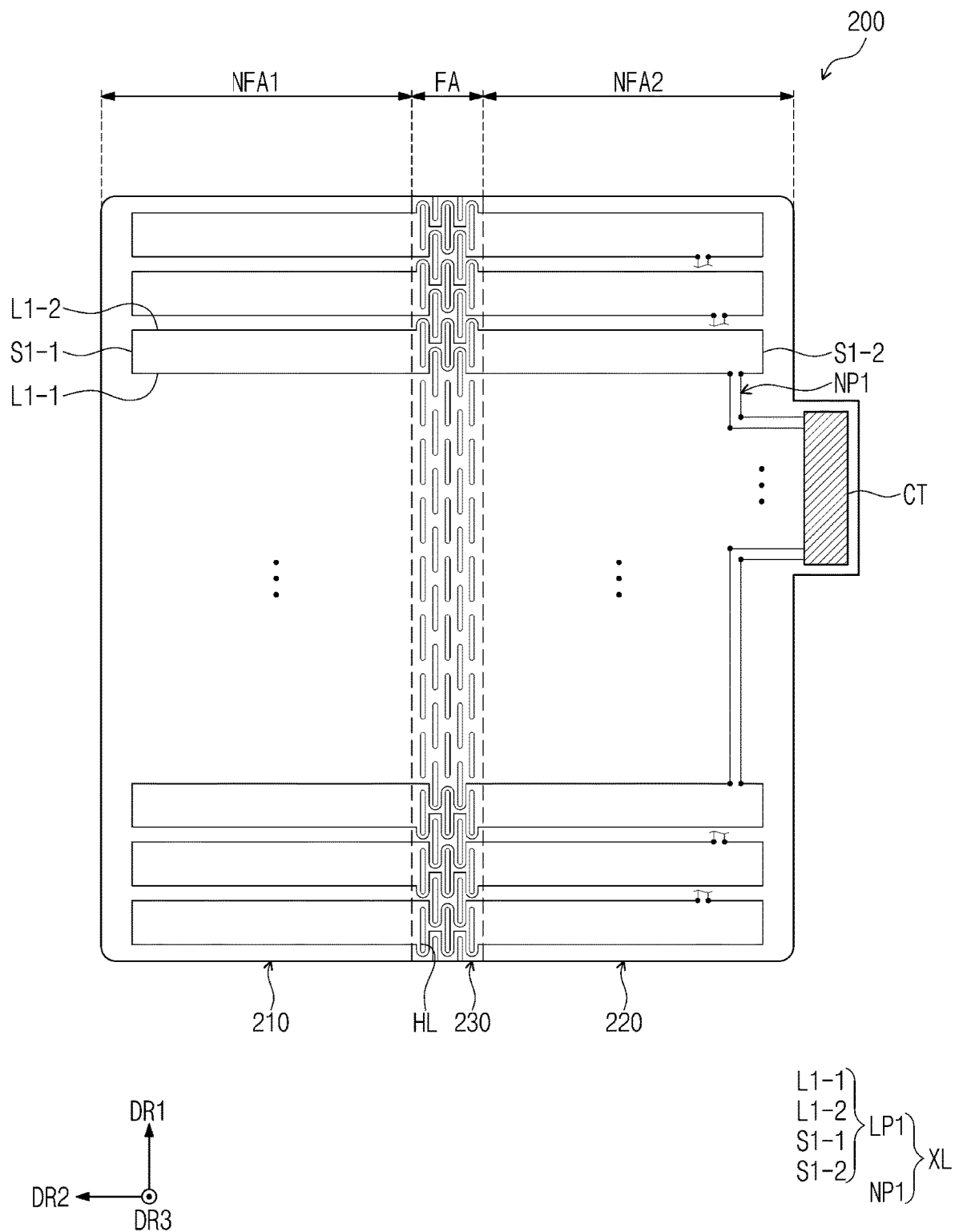
FIG. 5A is a schematic plan view of components of a digitizer according to an embodiment.
Figure 5B:
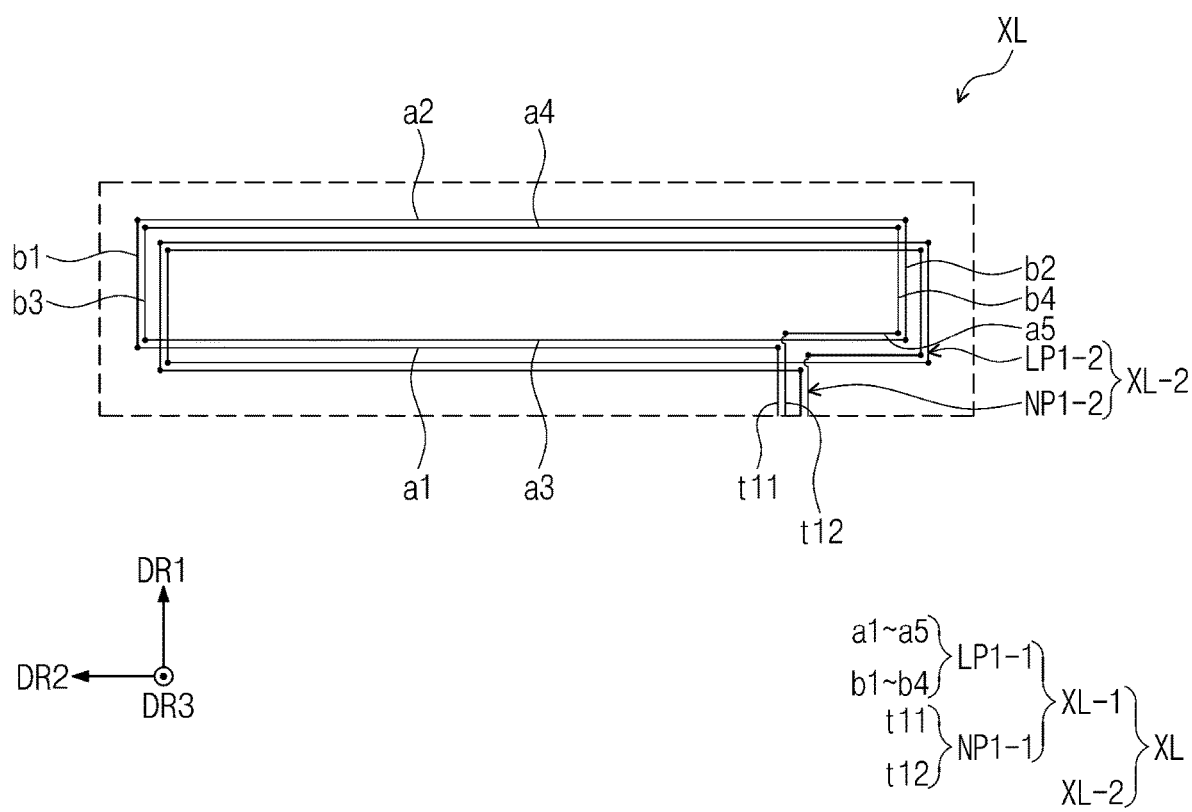
FIG. 5B is an enlarged schematic plan view of components of a digitizer according to an embodiment.
Figure 6A:
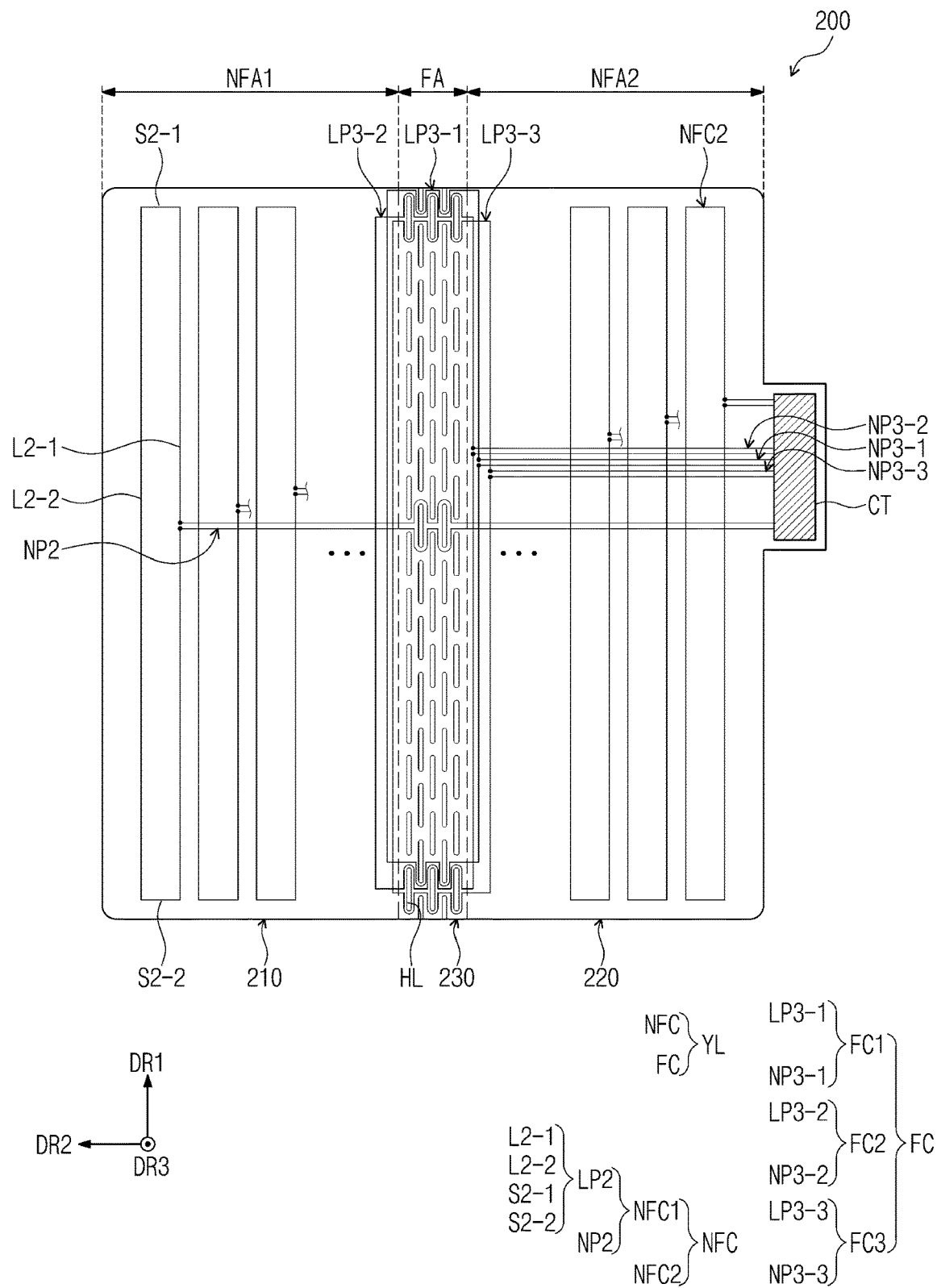
FIG. 6A is a schematic plan view of components of a digitizer according to an embodiment.
Figure 6B:
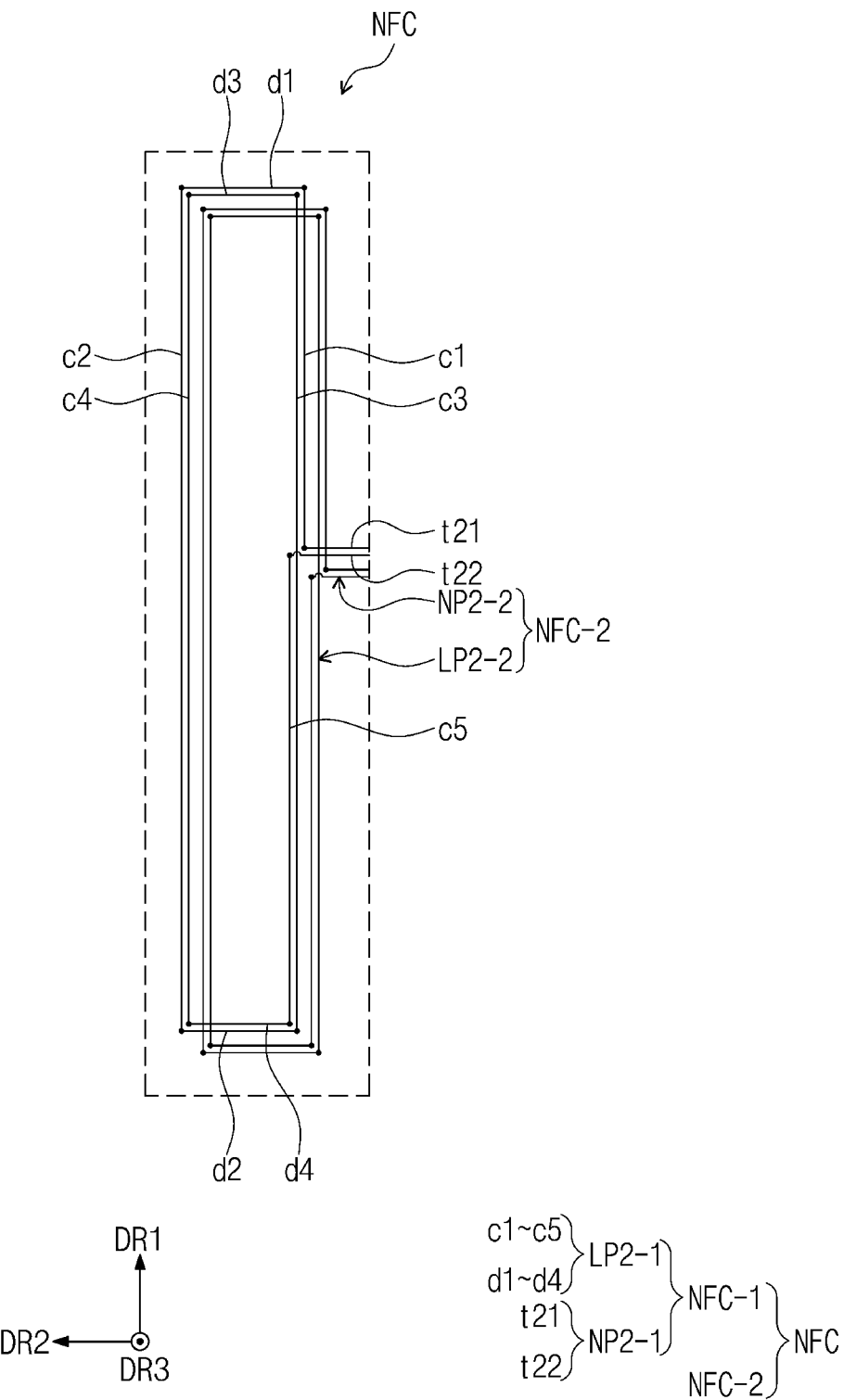
FIG. 6B is an enlarged schematic plan view of components of a digitizer according to an embodiment.
Figure 6C:
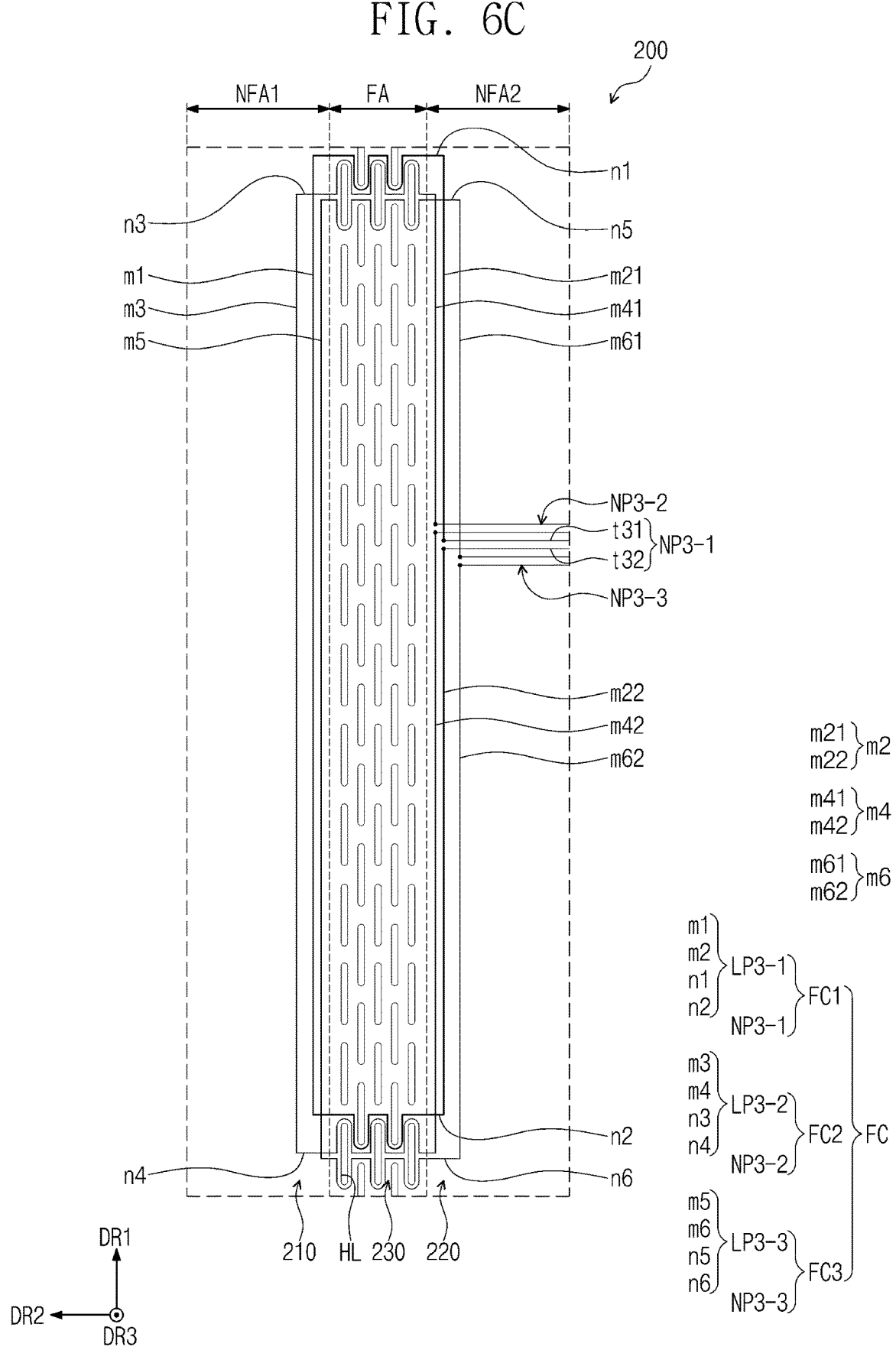
FIG. 6C is an enlarged schematic plan view of a partial area of a digitizer according to an embodiment.

FIG. 5A is a schematic plan view of components of a digitizer according to an embodiment. FIG. 5B is an enlarged schematic plan view of components of a digitizer according to an embodiment. FIG. 6A is a schematic plan view of components of a digitizer according to an embodiment. FIG. 6B is an enlarged schematic plan view of components of a digitizer according to an embodiment. FIG. 6C is an enlarged schematic plan view of a partial area of a digitizer according to an embodiment.

Referring to FIGS. 5A to 6C, the digitizer 200 may include sensing coils and a connector CT, and the sensing coils may include the first loop coils XL and the second loop coils YL. FIGS. 5A and 5B show the first loop coils XL, and FIGS. 6A to 6C show the second loop coils YL.

First, referring to FIGS. 5A and 5B, each of the first loop coils XL according to an embodiment may include a first coil portion LP1 and a connection portion NP1 connecting the first coil portion LP1 and the connector CT. Each of the first coil portions LP1 of the first loop coils XL may extend in the second direction DR2, and the first coil portions LP1 of the first loop coils XL may be arranged or disposed in the first direction DR1.

Each of the first coil portions LP1 may include first long sides L1-1 and L1-2 and first short sides S1-1 and S1-2.

Each of the first long sides L1-1 and L1-2 may extend in the second direction DR2, and the first long sides L1-1 and L1-2 may be spaced apart from each other in the first direction DR1. Each of the first long sides L1-1 and L1-2 may extend from the first non-folding portion 210 to the second non-folding portion 220 and may cross the folding portion 230. A portion of the first long sides L1-1 and L1-2 crossing the folding portion 230 may pass between the holes HL. A detailed description thereof will be given later.

Each of the first short sides S1-1 and S1-2 may extend in the first direction DR1, and the first short sides S1-1 and S1-2 may be spaced apart from each other in the second direction DR2. The first short sides S1-1 and S1-2 may connect one ends and the other ends of the first long sides L1-1 and L1-2 to one another.

In one embodiment, one of the first long sides L1-1 and L1-2 may include spaced portions and may be connected to the first connection portion NP1 through the spaced portions.

As shown in FIG. 5B, in one embodiment, the first loop coils XL may include a 1-1-th sub-loop coil XL-1 and a 1-2-th sub-loop coil XL-2, and a pair of 1-1-th sub-loop coil XL-1 and 1-2-th sub-loop coil XL-2 may be repeatedly arranged or disposed in the first direction DR1.

The 1-1-th sub-loop coil XL-1 may include a 1-1-th coil portion LP1-1 and a 1-1-th connection portion NP1-1, and the 1-2-th sub-loop coil XL-2 may include a 1-2-th coil portion LP1-2 and a 1-2-th connection portion NP1-2.

Each of the 1-1-th coil portion LP1-1 and the 1-2-th coil portion LP1-2 may be a two-turn coil. By way of example, for each of the 1-1-th coil portion LP1-1 and the 1-2-th coil portion LP1-2, first long sides a1 to a5 may include 1-1-th, 1-2-th, 1-3-th, 1-4-th, and 1-5-th long sides a1, a2, a3, a4, and a5, and first short sides b1 to b4 may include the 1-1-th, 1-2-th, 1-3-th, and 1-4-th short sides b1, b2, b3, and b4. The 1-1-th coil portion LP1-1 and the 1-2-th coil portion LP1-2 may be formed in such a way that the 1-1-th long side a1, the 1-1-th short side b1, the 1-2-th long side a2, the 1-2-th short side b2, the 1-3-th long side a3, the 1-3-th short side b3, the 1-4-th long side a4, the 1-4-th short side b4, and the 1-5-th long side a5 are sequentially extended to form an open loop wound twice in total.

The number of turns of the open loop in each of the 1-1-th coil portion LP1-1 and the 1-2-th coil portion LP1-2 is not limited thereto. For example, each of the 1-1-th coil portion LP1-1 and the 1-2-th coil portion LP1-2 may form an open loop wound once or an open loop wound the number of times greater than twice (for example, 4 times).

The inner space defined by the open loop of the 1-1-th coil portion LP1-1 may partially overlap the inner space defined by the open loop of the 1-2-th coil portion LP1-2. Each of the 1-1-th coil portion LP1-1 and the 1-2-th coil portion LP1-2 may constitute one channel. By arranging two adjacent channels to overlap each other, the y-coordinate (for example, the coordinate in the first direction DR1) may be detected more precisely through the distribution of the electromagnetic field sensed by the 1-1-th coil portion LP1-1 and the distribution of the electromagnetic field sensed by the 1-2-th coil portion LP1-2.

In an embodiment, the first long sides a1 to a5 and the first short sides b1 to b4 may be disposed on different layers. For example, the first long sides a1 to a5 may be disposed on the base layer BG (see FIG. 4) in correspondence with the first conductive layer CL1 of FIG. 4 and covered by the first cover layer IL1 (see FIG. 4). The first short sides b1 to b4 may be disposed under the base layer BG (see FIG. 4) in correspondence with the second conductive layer CL2 of FIG. 4 and covered by the second cover layer IL2 (see FIG. 4).

The first long sides a1 to a5 and the first short sides b1 to b4 may be connected to each other through contact holes formed by passing through the base layer BG (see FIG. 4). Accordingly, even in case that overlapping points are formed between the first long sides a1 to a5 and the first short sides b1 to b4, each of the first loop coils XL may form an open loop.

In an embodiment, a portion crossing the folding portion 230 among portions of the first long sides a1 to a5 may be disposed on a different layer from the remaining portions. For example, a portion crossing the folding portion 230 among portions of the first long sides a1 to a5 may be disposed on the same layer as the first short sides b1 to b4, and connected to the remaining portions through contact holes defined in the base layer BG (see FIG. 4). The portion crossing the folding portion 230 may have a space limitation as the portion needs to pass through between the holes HL, but the space limitation may be solved by arranging the portion on another layer.

The disclosure is not limited thereto, and the first long sides a1 to a5 and the first short sides b1 to b4 may be disposed on the same layer, and may be disposed on different layers in a portion corresponding to portions in which first long sides a1 to a5 and the first short sides b1 to b4 overlap each other.

Each of the 1-1-th and 1-2-th connection portions NP1-1 and NP1-2 may include a 1-1-th connection line t11 connected to one-side ends of the 1-1-th and 1-2-th coil portions LP1-1 and LP1-2 and a 1-2-th connection line t12 connected to the other-side ends of the 1-1-th and 1-2-th coil portions LP1-1 and LP1-2. In one embodiment, one end of the 1-1-th coil portion LP1-1 may correspond to one end of the 1-1-th long side a1 (or, the 1-1-th sub-line) spaced apart from the 1-1-th short side b1, and the other end of the 1-1-th coil portion LP1-1 may correspond to one end of the 1-5-th long side a5 (or, the 1-2-th sub-line) spaced apart from the 1-4-th short side b4.

As shown in FIG. 5A, each of the first connection portions NP1 (for example, the 1-1-th and 1-2-th connection lines t11 and t12 in FIG. 5B) may include a line extending in the first direction DR1 (hereinafter, referred to as a first sub-connection line) and a line extending in the second direction DR2 (hereinafter, referred to as a second sub-connection line). However, the disclosure is not limited thereto, and the shape and positions of the first connection portions NP1 are not limited to any one embodiment as long as the first connection portions NP1 is able to electrically connect the first coil portions LP1 and the connector CT.

Among the first connection portions NP1, a line extending in the first direction DR1 and a line extending in the second direction DR2 may be disposed on different layers. For example, a line extending in the first direction DR1 among the first connection portions NP1 may correspond to the second conductive layer CL2 of FIG. 4, and a line extending in the second direction DR2 among the first connection portions NP1 may correspond to the third conductive layer CL3 of FIG. 4. However, the disclosure is not limited thereto, and all of the first connection portions NP1 may be disposed on the same layer. For example, all of the first connection portions NP1 may correspond to the third conductive layer CL3 of FIG. 4.

Referring to FIGS. 6A to 6C, the second loop coils YL according to an embodiment may include non-folding coils NFC and folding coils FC.

The non-folding coils NFC may include first non-folding coils NFC1 disposed in the first non-folding portion 210 and overlapping the first non-folding area NFA1 and second non-folding coils NFC2 disposed in the second non-folding portion 220 and overlapping the second non-folding area NFA2. The folding coils FC may be disposed between the first non-folding coils NFC1 and the second non-folding coils NFC2, and at least a portion of the folding coils FC may be disposed in a folding portion 230 to overlap the folding area FA. According to the disclosure, the non-folding coils NFC and the folding coils FC may be driven in different sensing modes. A detailed description thereof will be given later.

First, referring to FIGS. 6A and 6B, each of the first non-folding coils NFC1 and the second non-folding coils NFC2 may include a second coil portion LP2 and a second connection portion NP2. Each of the second coil portions LP2 of the first and second non-folding coils NFC1 and NFC2 may extend in the first direction DR1, and the second coil portions LP2 of the first and second non-folding coils NFC1 and NFC2 may be arranged or disposed in the second direction DR2.

Each of the second coil portions LP2 may include second long sides L2-1 and L2-2 and second short sides S2-1 and S2-2.

Each of the second long sides L2-1 and L2-2 may extend in the first direction DR1, and the second long sides L2-1 and L2-2 may be spaced apart from each other in the second direction DR2. Each of the second short sides S2-1 and S2-2 may extend in the second direction DR2, and the second short sides S2-1 and S2-2 may be spaced apart from each other in the first direction DR1. The second short sides S2-1 and S2-2 may connect one ends and the other ends of the second long sides L2-1 and L2-2 to one another.

In one embodiment, one of the second long sides L2-1 and L2-2 may include spaced portions and may be connected to the second connection portion NP2 through the spaced portions.

As shown in FIG. 6B, in one embodiment, each of the non-folding coils NFC may include a first sub non-folding coil NFC-1 and a second sub non-folding coil NFC-2, and a pair of first sub non-folding coil NFC-1 and second sub non-folding coil NFC-2 may be repeatedly arranged or disposed in the second direction DR2.

The first sub non-folding coil NFC-1 may include a 2-1-th coil portion LP2-1 and a 2-1-th connection portion NP2-1, and the second sub non-folding coil NFC-2 may include a 2-2-th coil portion LP2-2 and a 2-2-th connection portion NP2-2.

Each of the 2-1-th coil portion LP2-1 and the 2-2-th coil portion LP2-2 may be formed of a two-turn coil. By way of example, for each of the 2-1-th coil portion LP2-1 and the 2-2-th coil portion LP2-2, second long sides c1 to c5 may include 2-1-th, 2-2-th, 2-3-th, 2-4-th, and 2-5-th long sides c1, c2, c3, c4, and c5 (the first, second, third, fourth, and fifth non-folding long sides of claim), and second short sides d1 to d4 may include the 2-1-th, 2-2-th, 2-3-th, and 2-4-th short sides d1, d2, d3, and d4 (the first, second, third, and fourth non-folding short sides of claim). The 2-1-th coil portion LP2-1 and the 2-2-th coil portion LP2-2 may be formed in such a way that the 2-1-th long side c1, the 2-1-th short side d1, the 2-2-th long side c2, the 2-2-th short side d2, the 2-3-th long side c3, the 2-3-th short side d3, the 2-4-th long side c4, the 2-4-th short side d4, and the 2-5-th long side c5 are sequentially extended to form an open loop wound twice in total.

The inner space defined by the open loop of the 2-1-th coil portion LP2-1 may partially overlap the inner space defined by the open loop of the 2-2-th coil portion LP2-2. Each of the 2-1-th coil portion LP2-1 and the 2-2-th coil portion LP2-2 may constitute one channel. By arranging two adjacent channels to overlap each other, the x-coordinate (for example, the coordinate in the second direction DR2) may be detected more precisely through the distribution of the electromagnetic field sensed by the 2-1-th coil portion LP2-1 and the distribution of the electromagnetic field sensed by the 2-2-th coil portion LP2-2.

In an embodiment, the second long sides c1 to c5 and the second short sides d1 to d4 may be disposed on different layers. For example, the second long sides c1 to c5 may be disposed under the base layer BG (see FIG. 4) in correspondence with the second conductive layer CL2 of FIG. 4 and covered by the second cover layer IL2 (see FIG. 4). The second short sides d1 to d4 may be disposed on the base layer BG (see FIG. 4) in correspondence with the first conductive layer CL1 of FIG. 4 and covered by the first cover layer IL1 (see FIG. 4). The second long sides c1 to c5 may be disposed on the same layer as the first short sides b1 to b4 of FIG. 5B, and the second short sides d1 to d4 may be disposed on the same layer as the first long sides a2 to a5 of FIG. 5B.

The second long sides c1 to c5 and the second short sides d1 to d4 may be connected to each other through contact holes formed by passing through the base layer BG (see FIG. 4). Accordingly, even in case that overlapping points are formed between the second long sides c1 to c5 and the second short sides d1 to d4, each of the non-folding coils NFC may form an open loop.

The disclosure is not limited thereto, and the second long sides c1 to c5 and the second short sides d1 to d4 may be disposed on the same layer, and may be disposed on different layers in a portion corresponding to portions in which the second long sides c1 to c5 and the second short sides d1 to d4 overlap each other.

Each of the 2-1-th and 2-2-th connection portions NP2-1 and NP2-2 may include a 2-1-th connection line t21 connected to one-side ends of the 2-1-th and 2-2-th coil portions LP2-1 and LP2-2 and a 2-2-th connection line t22 connected to the other-side ends of the 2-1-th and 2-2-th coil portions LP2-1 and LP2-2. In one embodiment, one end of the 2-1-th coil portion LP2-1 may correspond to one end of the 2-1-th long side c1 (or, the 2-1-th sub-line) spaced apart from the 2-1-th short side d1, and the other end of the 2-1-th coil portion LP2-1 may correspond to one end of the 2-5-th long side c5 (or, the 2-2-th sub-line) spaced apart from the 2-4-th short side d4.

As shown in FIG. 6A, each of the second connection portions NP2 may extend in the second direction DR2. Among the second connection portions NP2, the second connection portions NP2 connected to the first non-folding coils NFC1 may cross the folding portion 230 while passing between the holes HL. However, the disclosure is not limited thereto, and as long as the second coil portions LP2 and the connector CT are able to be electrically connected, the shape and positions of the second connection portions NP2 are not limited to any one embodiment.

In one embodiment, the second connection portions NP2 may be disposed on a layer different from that of the second coil portions LP2. For example, each of the second connection portions NP2 may correspond to the third conductive layer CL3 of FIG. 4.

Referring to FIGS. 6A and 6C, the folding coils FC may include a first folding coil FC1, a second folding coil FC2, and a third folding coil FC3. The first to third folding coils FC1, FC2, and FC3 may include 3-1-th to 3-3-th coil portions LP3-1, LP3-2, and LP3-3 and 3-1-th to 3-3-th connection portions NP3-1, NP3-2, and NP3-3. Each of the 3-1-th to 3-3-th coil portions LP3-1, LP3-2, and LP3-3 may extend in the first direction DR1. The 3-1-th to 3-3-th connection portions NP3-1, NP3-2, and NP3-3 may connect the 3-1-th to 3-3-th coil portions LP3-1, LP3-2, and LP3-3 to the connector CT, respectively.

The 3-1-th coil portion LP3-1 of the first folding coil FC1 may include 3-1-th long sides m1 and m2 and 3-1-th short sides n1 and n2. Each of the 3-1-th long sides m1 and m2 may extend in the first direction DR1, and the 3-1-th long sides m1 and m2 may be spaced apart from each other in the second direction DR2. The 3-1-th long sides m1 and m2 may include the first sub long side m1 and the second sub long side m2. In an embodiment, the first sub long side m1 may be disposed on the first non-folding portion 210 and the second sub long side m2 may be disposed on the second non-folding portion 220.

In one embodiment, the second sub long side m2 may include a 2-1-th sub long side m21 and a 2-2-th sub long side m22, one end of the 2-1-th sub long side m21 and one end of the 2-2-th sub long side m22 may face each other in the first direction DR1. One end of the 2-1-th sub long side m21 and one end of the 2-2-th sub long side m22 may be connected to the 3-1-th connection portion NP3-1.

Each of the 3-1-th short sides n1 and n2 may extend in the second direction DR2, and the 3-1-th short sides n1 and n2 may be spaced apart from each other in the first direction DR1. The 3-1-th short sides n1 and n2 may connect one-side ends of the 3-1-th long sides m1 and m2 to the other-side ends of the 3-1-th long sides m1 and m2. The 3-1-th short sides n1 and n2 may include the first sub short side n1 disposed adjacent to the upper edge of the digitizer 200 and the second sub short side n2 disposed adjacent to the lower edge of the digitizer 200. In an embodiment, each of the first sub short side n1 and the second sub short side n2 may extend from the first non-folding portion 210 to the second non-folding portion 220 and cross the folding portion 230 while passing through between the holes HL.

The 3-1-th coil portion LP3-1 may constitute an open loop, and at least a part of the inner space defined in the 3-1-th coil portion LP3-1 may overlap the folding area FA.

The 3-2-th coil portion LP3-2 of the second folding coil FC2 may include 3-2-th long sides m3 and m4 and 3-2-th short sides n3 and n4. Each of the 3-2-th long sides m3 and m4 may extend in the first direction DR1, and the 3-2-th long sides m3 and m4 may be spaced apart from each other in the second direction DR2. The 3-2-th long sides m3 and m4 may include the third sub long side m3 and the fourth sub long side m4.

The third sub long side m3 may be spaced apart from the first sub long side m1 in a direction toward the inside of the first non-folding portion 210 (for example, in the second direction DR2). The fourth sub long side m4 may be spaced apart from the second sub long side m2 in a direction toward the inside of the folding portion 230 (for example, in the second direction DR2). In an embodiment, the third sub long side m3 may be disposed on the first non-folding portion 210 and the fourth sub long side m4 may be disposed on the second non-folding portion 220.

In one embodiment, the fourth sub long side m4 may include a 4-1-th sub long side m41 and a 4-2-th sub long side m42, one end of the 4-1-th sub long side m41 and one end of the 4-2-th sub long side m42 may face each other in the first direction DR1. One end of the 4-1-th sub long side m41 and one end of the 4-2-th sub long side m42 may be connected to the 3-2-th connection portion NP3-2.

Each of the 3-2-th short sides n3 and n4 may extend in the second direction DR2, and the 3-2-th short sides n3 and n4 may be spaced apart from each other in the first direction DR1. The 3-2-th short sides n3 and n4 may connect one-side ends of the 3-2-th long sides m3 and m4 to the other-side ends of the 3-2-th long sides m3 and m4. The 3-2-th short sides n3 and n4 may include the third sub short side n3 disposed adjacent to an upper edge and the fourth sub short side n4 disposed adjacent to a lower edge.

In an embodiment, a direction in which the third sub short side n3 is spaced apart from the first sub short side n1 may be the same as a direction in which the fourth sub short side n4 is spaced apart from the second sub short side n2. For example, in case that the third sub short side n3 is spaced apart from the first sub short side n1 in a direction opposite to the first direction DR1, the fourth sub short side n4 may be spaced apart from the second sub short side n2 in a direction opposite to the first direction DR1.

In an embodiment, each of the third sub short side n3 and the fourth sub short side n4 may extend from the first non-folding portion 210 to the second non-folding portion 220 and cross the folding portion 230 while passing through between the holes HL.

The 3-2-th coil portion LP3-2 may constitute an open loop, and at least a part of the inner space defined in the 3-2-th coil portion LP3-2 may overlap the first non-folding area NFA1.

The 3-3-th coil portion LP3-3 of the third folding coil FC3 may include 3-3-th long sides m5 and m6 and 3-3-th short sides n5 and n6. Each of the 3-3-th long sides m5 and m6 may extend in the first direction DR1, and the 3-3-th long sides m5 and m6 may be spaced apart from each other in the second direction DR2. The 3-3-th long sides m5 and m6 may include the fifth sub long side m5 and the sixth sub long side m6.

The fifth sub long side m5 may be spaced apart from the first sub long side m1 in a direction toward the inside of the folding portion 230 (for example, in a direction opposite to the second direction DR2). The sixth sub long side m6 may be spaced apart from the second sub long side m2 in a direction toward the inside of the second non-folding portion 220 (for example, in a direction opposite to the second direction DR2). In an embodiment, the fifth sub long side m5 may be disposed on the first non-folding portion 210 and the sixth sub long side m6 may be disposed on the second non-folding portion 220.

In one embodiment, the sixth sub long side m6 may include a 6-1-th sub long side m61 and a 6-2-th sub long side m62, one end of the 6-1-th sub long side m61 and one end of the 6-2-th sub long side m62 may face each other in the first direction DR1. One end of the 6-1-th sub long side m61 and one end of the 6-2-th sub long side m62 may be connected to the 3-3-th connection portion NP3-3.

Each of the 3-3-th short sides n5 and n6 may extend in the second direction DR2, and the 3-3-th short sides n5 and n6 may be spaced apart from each other in the first direction DR1. The 3-3-th short sides n5 and n6 may connect one-side ends of the 3-3-th long sides m5 and m6 to the other-side ends of the 3-3-th long sides m5 and m6. The 3-3-th short sides n5 and n6 may include the fifth sub short side n5 disposed adjacent to an upper edge and the sixth sub short side n6 disposed adjacent to a lower edge.

In an embodiment, a direction in which the fifth sub short side n5 is spaced apart from the first sub short side n1 and the third sub short side n3 may be the same as a direction in which the sixth sub short side n6 is spaced apart from the second sub short side n2 and the fourth sub short side n4. For example, in case that the fifth sub short side n5 is spaced apart from the first and third sub short sides n1 and n3 in a direction opposite to the first direction DR1, the sixth sub short side n6 may be spaced apart from the second and fourth sub short sides n2 and n4 in a direction opposite to the first direction DR1.

In an embodiment, each of the fifth sub short side n5 and the sixth sub short side n6 may extend from the first non-folding portion 210 to the second non-folding portion 220 and cross the folding portion 230 while passing through between the holes HL.

According to an embodiment, the 3-2-th coil portion LP3-2 may be disposed more adjacent to the inner side of the first non-folding portion 210 than the 3-1-th and 3-3-th coil portions LP3-1 and LP3-3, and the 3-3-th coil portion LP3-3 may be disposed more adjacent to the inner side of the second non-folding portion 220 than the 3-1-th and 3-2-th coil portions LP3-1 and LP3-2.

FIG. 6A is an example that one long sides of the 3-1-th to 3-3-th coil portions LP3-1, LP3-2, and LP3-3 may be all disposed on the first non-folding portion 210, and the other long sides of the 3-1-th to 3-3-th coil portions LP3-1, LP3-2, and LP3-3 may be all disposed on the second non-folding portion 220 and positions of the first to sixth sub long sides m1 to m6 are not limited thereto, and a detailed description thereof will be given later.

In an embodiment, the 3-1-th to 3-3-th long sides m1, m2, m3, m4, m5, and m6 and the 3-1-th to 3-3-th short sides n1, n2, n3, n4, n5, and n6 may be disposed on different layers. For example, the 3-1-th to 3-3-th long sides m1, m2, m3, m4, m5, and m6 and the 2-1-th to 2-5-th long sides c1, c2, c3, c4, and c5 may be disposed on a same layer. For example, the 3-1-th to 3-3-th long sides m1, m2, m3, m4, m5, and m6 may be correspond to the second conductive layer CL2 of FIG. 4, and the 3-1-th to 3-3-th short sides n1, n2, n3, n4, n5, and n6 may correspond to the third conductive layer CL3 of FIG. 4. The 3-1-th to 3-3-th long sides m1, m2, m3, m4, m5, and m6 may be connected to the 3-1-th to 3-3-th short sides n1, n2, n3, n4, n5, and n6 by contact holes CN2 of FIG. 4 passing through the second cover layer IL2 of FIG. 4.

The 3-1-th to 3-3-th connection portions NP3-1, NP3-2, and NP3-3 may extend from the 3-1-th to 3-3-th coil portions LP3-1, LP3-2, and LP3-3 to the connector CT, respectively. Each of the 3-1-th to 3-3-th connection portions NP3-1, NP3-2, and NP3-3 may include a 3-1-th connection line t31 and a 3-2-th connection line t32. The 3-1-th connection line t31 may be connected to one end of a corresponding coil portion (for example, one end of the 2-1-th, 4-1-th, or 6-1-th sub long side m21, m41, or m61) among the 3-1-th to 3-3-th coil portions LP3-1, LP3-2, and LP3-3. The 3-2-th connection line t32 may be connected to the one end of a corresponding coil portion (for example, one end of the 2-2-th, 4-2-th, or 6-2-th sub long side m22, m42, or m62) among the 3-1-th to 3-3-th coil portions LP3-1, LP3-2, and LP3-3.

It is illustrated in FIG. 6A as an example that the 3-1-th and 3-2-th connection lines t31 and t32 of each of the 3-1-th to 3-3-th connection portions NP3-1, NP3-2, and NP3-3 are disposed in the second non-folding portion 220 and extend in the second direction DR2. However, the disclosure is not limited thereto, and the shape and positions of the 3-1-th to 3-3-th connection portions NP3-1, NP3-2, and NP3-3 are not limited to any one embodiment as long as the 3-1-th to 3-3-th connection portions NP3-1, NP3-2, and NP3-3 are able to electrically connect the 3-1-th to 3-3-th coil portions LP3-1, LP3-2, and LP3-3 and the connector CT.

In one embodiment, the 3-1-th to 3-3-th connection portions NP3-1, NP3-2, and NP3-3 may be disposed on different layers from those of the first to sixth sub long sides m1, m2, m3, m4, m5 and m6 of the 3-1-th to 3-3-th coil portions LP3-1, LP3-2, and LP3-3. For example, the 3-1-th to 3-3-th connection portions NP3-1, NP3-2, and NP3-3 may correspond to the third conductive layer CL3 of FIG. 4.

In an embodiment, the first folding coil FC1 and the second folding coil FC2 may be driven to constitute the same channel (for example, the first channel). Accordingly, the sum of the area (or the loop area) of the inner space formed by the first folding coil FC1 and the area of the inner space formed by the second folding coil FC2 may constitute one channel, and the first folding coil FC1 and the second folding coil FC2 may be driven to correspond to a two-turn coil.

Also, the first folding coil FC1 and the third folding coil FC3 may be driven to constitute the same channel (for example, a second channel different from the first channel). The first folding coil FC1 may be driven in a multi-channel. Accordingly, the sum of the area of the inner space formed by the first folding coil FC1 and the area of the inner space formed by the third folding coil FC3 may constitute another channel, and the first folding coil FC1 and the third folding coil FC3 may be driven to correspond to a two-turn coil.

According to an embodiment, by including the second folding coil FC2 more adjacent to the inner side of the first non-folding portion 210 than the first folding coil FC1 and the third folding coil FC3 more adjacent to the inner side of the second non-folding portion 220 than the first folding coil FC1, the x-coordinate (for example, the coordinate in the second direction DR2) at which a pen is input within the folding portion 230 may be detected more precisely through distribution of the electromagnetic field sensed by the first folding coil FC1 and the second folding coil FC2 and the distribution of the electromagnetic field sensed by the first folding coil FC1 and the third folding coil FC3. Accordingly, the first to third folding coils FC1, FC2, and FC3 may be driven in a manner similar to that of the non-folding coils FC including a pair of first and second sub non-folding coils NFC-1 and NFC-2 described above with reference to FIG. 6B.

According to an embodiment, by driving the first folding coil FC1 in a multi-channel, two channels each formed of a two-turn coil may be provided using the first to third folding coils FC1, FC2, and FC3 each formed of a one-turn coil. Accordingly, the number of wires crossing the folding portion 230 may be reduced compared to an embodiment in which two two-turn coils are provided.

In an embodiment, the second loop coils YL may be referred to as drive coils and the first loop coils XL may be referred to as sensing coils, but are not limited thereto, and vice versa. In case that a current flows through the second loop coils YL, magnetic lines of force may be induced between the second loop coils YL and the first loop coils XL. The first loop coils XL may sense the induced electromagnetic force emitted from an electromagnetic pen and output a sensing signal to one terminal of each of the first loop coils XL.

Figure 7:
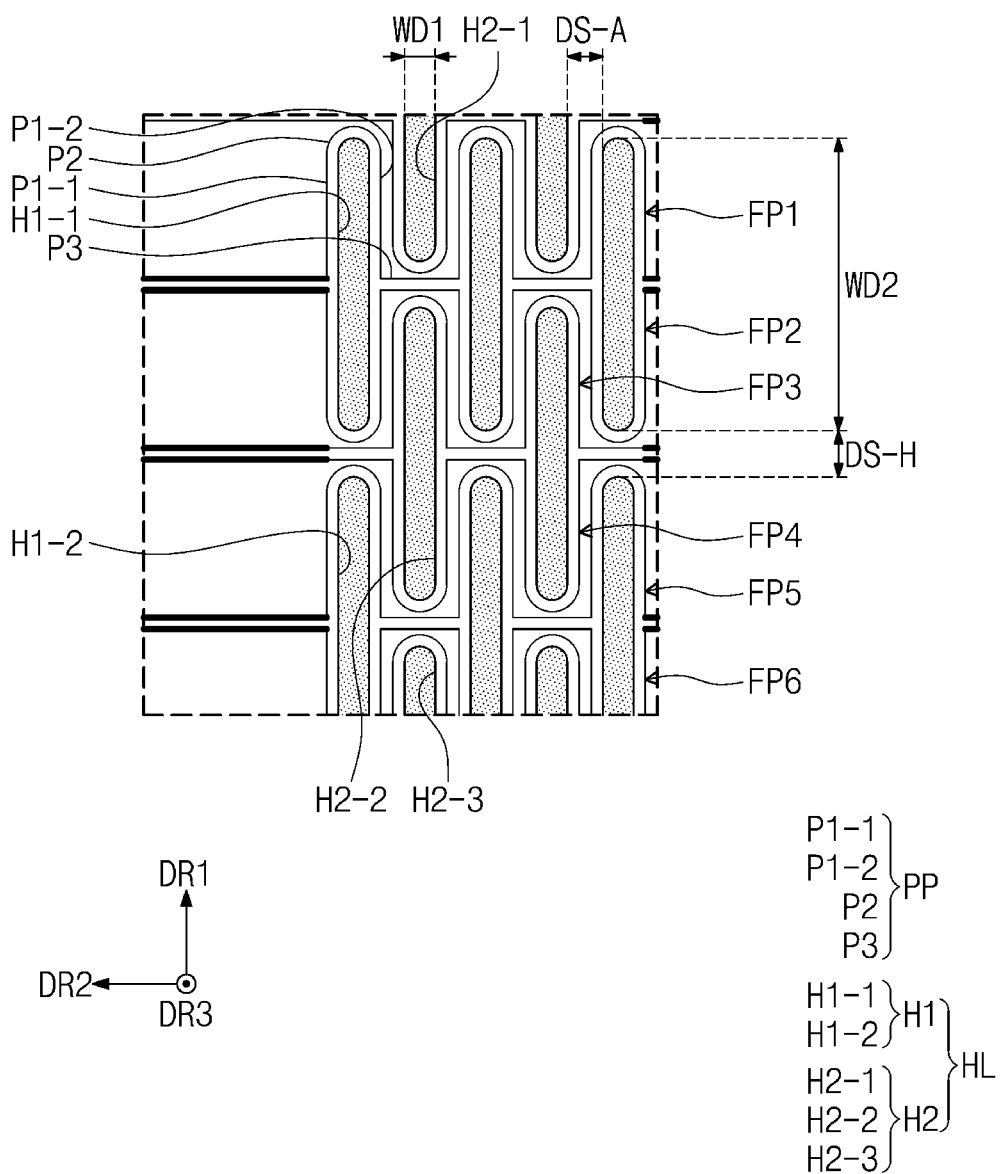
FIG. 7 is an enlarged schematic plan view of components of a digitizer according to an embodiment.

FIG. 7 is an enlarged schematic plan view of configurations of a digitizer according to an embodiment. FIG. 7 is an enlarged view of a portion crossing the folding portion 230 (see FIGS. 5A and 6A) among sensing coils. The shape of the coil shown in FIG. 7 may be applied to the first coil portions LP1 of the first loop coils XL described above in FIG. 5A, and may also be applied to the second connection portions NP2 of the first non-folding coils NFC1 described above in FIG. 6A. The shape of the coil shown in FIG. 7 may be applied to the 3-1-th to 3-3-th coil portions LP3-1, LP3-2, and LP3-3 of the first to third folding coils FC1, FC2, and FC3 described above in FIG. 6A.

Referring to FIG. 7, each of the holes HL defined in the folding portion 230 (see FIGS. 5A and 6A) may have a first width WD1 in the second direction DR2. The first width WD1 may be greater than or equal to about 0.1 mm and less than or equal to about 0.5 mm. Each of the holes HL may have a second width WD2 in the first direction DR1. The second width WD2 may be greater than or equal to about 4 mm and less than or equal to about 10 mm.

In an embodiment, the holes HL may include first group holes H1 and second group holes H2. For example, the first group holes H1 may include a 1-1-th hole H1-1 and a 1-2-th hole H1-2 arranged or disposed in the first direction DR1. The second group holes H2 may include a 2-1-th hole H2-1, a 2-2-th hole H2-2 and a 2-3-th hole H2-3 spaced apart from the first group holes H1 in the second direction DR2 and arranged or disposed in the first direction DR1.

The second group hole H2 may be shifted from the first group hole H1 by a selectable distance in the first direction DR1. According to an embodiment, the shifted distance may be less than half of the second width WD2. Accordingly, the shape of a remaining portion excluding the holes HL in the folding portion 230 (see FIGS. 5A and 6A) may have a grid-patterned slit shape.

In one embodiment, a first separation distance DS-A between overlapping holes among the holes included in different groups when viewed in the second direction DR2, for example, the first separation distance DS-A between the 1-1-th hole H1-1 of the first group holes H1 and the 2-1-th hole H2-1 of the second group holes H2 in the second direction DR2 may be greater than or equal to about 0.1 mm and less than or equal to about 0.3 mm.

In one embodiment, a second separation distance DS-H between adjacent holes among the holes included in the same group in the first direction DR1, for example, the second separation distance DS-H between the 1-1-th hole H1-1 and the 1-2-th hole H1-2 included in the first group holes H1 in the first direction DR1 may be greater than or equal to about 0.1 mm and less than or equal to about 0.3 mm.

Among the first and second loop coils XL and YL (see FIGS. 5A and 6A), portions disposed on the folding portion 230 (see FIGS. 5A and 6A) (hereinafter, folding portions FP1, FP2, FP3, FP4, FP5, and FP6) may each include pattern portions PP connected to each other. One pattern PP of each of the folding portions FP1, FP2, FP3, FP4, FP5, and FP6 may include a 1-1-th pattern P1-1, a 1-2-th pattern P1-2, a second pattern P2, and a third pattern P3.

The 1-1-th pattern P1-1 and the 1-2-th pattern P1-2 may extend in the first direction DR1, individually and may be spaced apart from each other in the second direction DR2 with one corresponding hole HL interposed therebetween. The second pattern P2 may be connected to one end of the 1-1-th pattern P1-1 and one end of the 1-2-th pattern P1-2 to connect the 1-1-th pattern P1-1 to the 1-2-th pattern P1-2.

One end of the third pattern P3 may be connected to the other end of the 1-2-th pattern P1-2 and the other end of the third pattern P3 may be connected to the other end of the 1-1-th pattern P1-1 of another pattern portion PP which is continuous thereto.

In an embodiment, the number of patterns PP disposed between adjacent holes HL among holes included in the same group may be four or less. Accordingly, one pattern may be disposed between selectable adjacent holes HL, and no patterns may be disposed between other adjacent holes HL.

Figure 8:
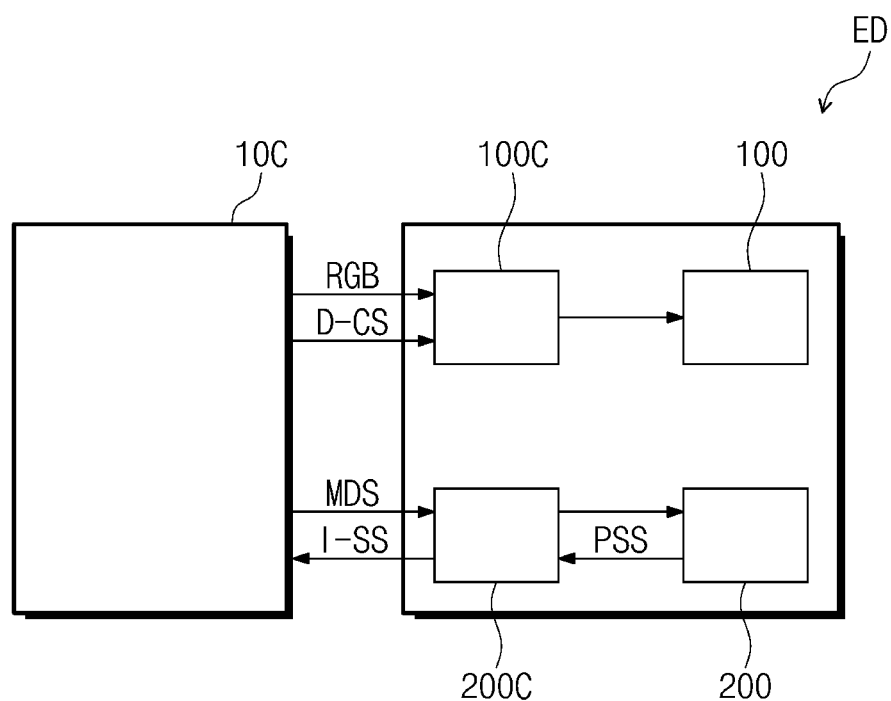
FIG. 8 is a block diagram of an electronic device according to an embodiment.

FIG. 8 is a block diagram of an electronic device according to an embodiment.

Referring to FIGS. 6A and 8 together, the electronic device ED may include a main controller 10C, a display module 100, a display controller 100C that drives the display module 100, the digitizer 200, and a sensor controller 200C that drives the digitizer 200.

The display controller 100C may receive an image signal RGB and a control signal D-CS from the main controller 10C. The main controller 10C may include a graphic controller. The control signal D-CS may include various signals. For example, the control signal D-CS may include an input vertical synchronization signal, an input horizontal synchronization signal, a main clock, a data enable signal, and the like within the spirit and the scope of the disclosure. The display controller 100C may generate a vertical synchronization signal and a horizontal synchronization signal for controlling timing for providing signals to the display module 100 based on the control signal D-CS.

The sensor controller 200C may receive a control signal from the main controller 10C. According to an embodiment, the control signal may include a mode determination signal MDS for determining a driving mode of the digitizer 200 and a clock signal. The sensor controller 200C may operate in a 'first mode' or a 'second mode' based on the mode determination signal MDS. The mode determination signal MDS may be generated based on whether the first folding coil FC1 has detected an input.

In an embodiment, the first folding coil FC1 may output a pre-sensing signal PSS. Through the pre-sensing signal PSS, it is possible to determine whether a pen input is made in the folding portion 230. The mode determination signal MDS may be generated based on whether the first folding coil FC1 has detected an input based on the pre-sensing signal PSS.

According to an embodiment, based on the pre-sensing signal PSS, in case that the first folding coil FC1 has not detected an input, the mode determination signal MDS may be determined to operate in the first mode. Based on the pre-sensing signal PSS, in case that the first folding coil FC1 has detected an input, the mode determination signal MDS may be determined to operate in the second mode.

In the first mode, the non-folding coils NFC of the second loop coils YL and the first loop coils XL (see FIG. 5A) may be driven. The first loop coils XL (see FIG. 5A) may output first sensing signals, and the non-folding coils NFC may output second sensing signals. The sensor controller 200C may calculate input coordinate information in the non-folding portions 210 and 220 based on the first and second sensing signals.

In the second mode, the folding coils FC of the second loop coils YL and the first loop coils XL (see FIG. 5A) may be driven. The first loop coils XL (see FIG. 5A) may output first sensing signals, and the folding coils FC may output third sensing signals. The sensor controller 200C may calculate input coordinate information in the folding portion 230 based on the first and third sensing signals.

The sensor controller 200C may calculate coordinate information in the non-folding portions 210 and 220 or the folding portion 230 based on the signal received from the digitizer 200, and provide a coordinate signal I-SS having the coordinate information to the main controller 10C. The main controller 10C may perform an operation corresponding to a user input based on the coordinate signal I-SS. For example, the main controller 10C may operate the display controller 100C to display a new application image on the display module 100.

According to an embodiment, among the second loop coils YL, the folding coils FC disposed on the folding portion 230 and the non-folding coils NFC disposed on the non-folding portions 210 and 220 may be independently driven. Accordingly, sensing precision in the folding portion 230 may be improved, and it is possible to be relatively free from space restrictions in the folding portion 230 in case that disposing the folding coils FC. Hereinafter, details will be described below.

In a comparative embodiment in which the folding portion 230 and the non-folding portions 210 and 220 are simultaneously driven, in case that the area of the inner space formed by the coil portions disposed in the folding portion 230 is the same as the area of the inner space formed by the coil portions disposed in the non-folding portions 210 and 220 and the distance between the coil portions disposed in the folding portion 230 is the same as the distance between the coil portions disposed in the non-folding portions 210 and 220, reliability of sensing in the folding portion 230 may be secured.

However, in the case of the coil portions disposed in the folding portion 230, a portion crossing the folding portion 230 may include some portions curved while passing between the holes HL, resulting in limitation in designing the same area of the inner spaces and the same distance between adjacent coils.

For example, as described above in FIG. 1B, in case that the electronic device ED is folded in a dumbbell shape, the area of the folding portion 230 increases, resulting in limitation in designing the same area of the inner spaces and the same distance between adjacent coils. For example, as the area of the folding portion 230 increases, the number of coils to be disposed in the folding portion 230 increases in order to design the same area of the inner spaces and the same distance between adjacent coils, causing restrictions on the space in which coils are to be disposed.

On the other hand, according to an embodiment, as the folding coils FC and the non-folding coils NFC are independently driven, for the folding portion 230, a reference for electromagnetic field strength for detecting whether a pen is input or not and a reference for an electromagnetic field strength for detecting the degree of pen input may be set differently from those for the non-folding portions 210 and 220. Accordingly, the sensing precision in the folding portion 230 may be improved even in case that the area of the inner space formed by the 3-1-th to 3-3-th coil portions LP3-1, LP3-2, and LP3-3 is different from the area of the inner space formed by the second coil portions LP2.

As the folding coils FC and the non-folding coils NFC is designed independently, the areas of the inner spaces of the folding coils FC and the distances between the adjacent folding coils FC may be provided differently from those of the non-folding coils NFC, thus being relatively free space restrictions in the folding portion 230.

In an embodiment, in case that there is no issue of space restrictions in the folding portion 230, the area of the inner space of each of the folding coils FC may be the same as that of the non-folding coils NFC. The sensor controller 200C may equally set the references of the electromagnetic field strength in the first mode and the second mode.

Figure 9:
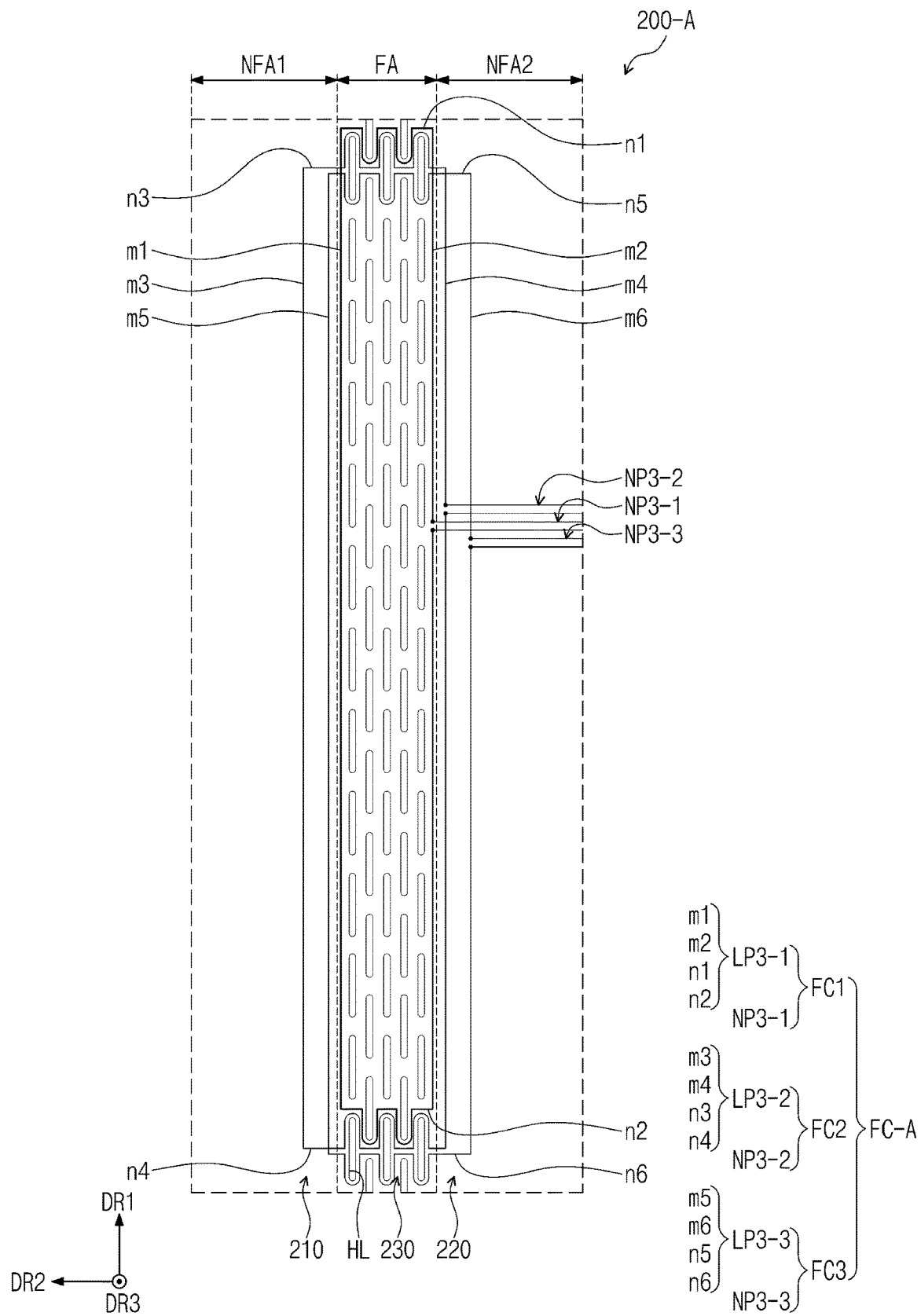
FIGS. 9 to 12 are enlarged schematic plan views of a partial area of a digitizer according to an embodiment.

Referring to FIG. 9, in a digitizer 200-A according to an embodiment, folding coils FC-A may include first to third folding coils FC1, FC2, and FC3.

The first folding coil FC1 may be disposed in the folding portion 230 and may overlap the folding area FA. The first folding coil FC1 may include the 3-1-th long sides m1 and m2 and the 3-1-th short sides n1 and n2, and the 3-1-th long sides m1 and m2 and the 3-1-th short sides n1 and n2 according to an embodiment may all be disposed in the folding portion 230. The 3-1-th long sides m1 and m2 may include the first sub long side m1 adjacent to the first non-folding portion 210 and the second sub long side m2 adjacent to the second non-folding portion 220.

The second folding coil FC2 may be disposed in the first non-folding portion 210, the folding portion 230, and the second non-folding portion 220. The second folding coil FC2 may include 3-2-th long sides m3 and m4 and 3-2-th short sides n3 and n4, and the 3-2-th long sides m3 and m4 may include the third sub long side m3 and the fourth sub long side m4.

The third sub long side m3 may be disposed in the first non-folding portion 210, and the fourth sub long side m4 may be disposed in the second non-folding portion 220. Accordingly, each of the 3-2-th short sides may extend from the first non-folding portion 210 to the second non-folding portion 220 and cross the folding portion 230. The shape described in FIG. 7 may be applied to a portion of each of the 3-2-th short sides n3 and n4.

The third folding coil FC3 may be disposed in the second non-folding portion 220, the folding portion 230, and the first non-folding portion 210. The third folding coil FC3 may include 3-3-th long sides m5 and m6 and 3-3-th short sides n5 and n6, and the 3-3-th long sides m5 and m6 may include the fifth sub long side m5 and the sixth sub long side m6.

The fifth sub long side m5 may be disposed on the first non-folding portion 210 and the sixth sub long side m6 may be disposed on the second non-folding portion 220. The fifth sub long side m5 may be disposed between the first sub long side m1 and the third sub long side m3, and the fourth sub long side m4 may be disposed between the second sub long side m2 and the sixth sub long side m6.

Figure 10:
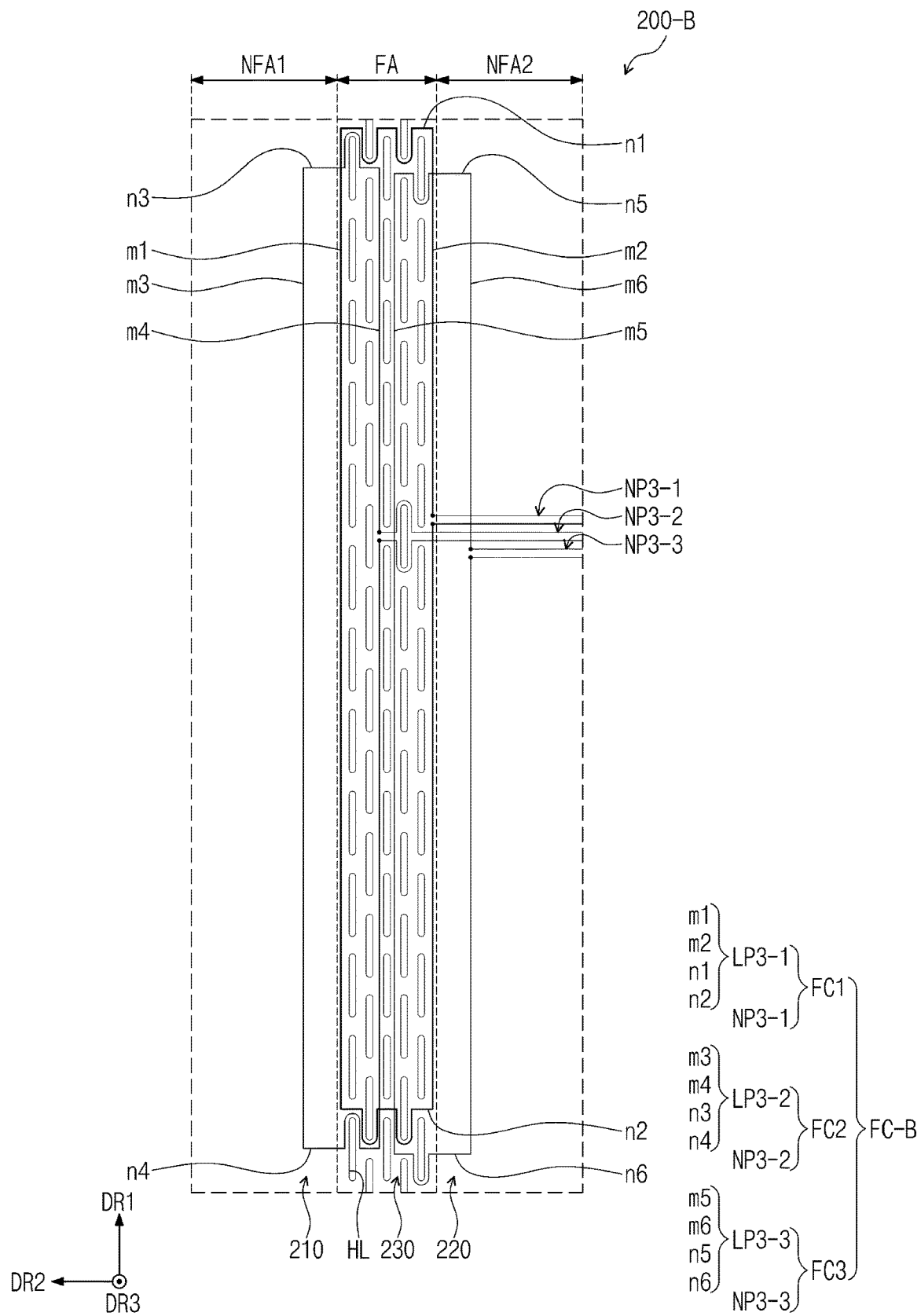

Referring to FIG. 10, in a digitizer 200-B according to an embodiment, folding coils FC-B may include first to third folding coils FC1, FC2, and FC3.

The first folding coil FC1 according to an embodiment may be disposed in the folding portion 230. The first sub long side m1 and the second sub long side m2 may all be disposed on the folding portion 230.

The second folding coil FC2 according to an embodiment may be disposed in the first non-folding portion 210 and the folding portion 230. The fourth sub long side m4 of the second folding coil FC2 may be disposed in the folding portion 230. The fourth sub long side m4 may be disposed in the inner side of the folding portion 230 more than the first sub long side m1.

The third folding coil FC3 according to an embodiment may be disposed in the second non-folding portion 220 and the folding portion 230. The fifth sub long side m5 of the third folding coil FC3 may be disposed in the folding portion 230. The fifth sub long side m5 may be disposed in the inner side of the folding portion 230 more than the second sub long side m2.

In an embodiment, the fourth sub long side m4 may be disposed more adjacent to the first non-folding portion 210 than the fifth sub long side m5, and the fifth sub long side m5 may be disposed more adjacent to the second non-folding portion 220 than the fourth sub long side m4, so that the second folding coil FC2 and the third folding coil FC3 may be disposed not to overlap each other.

Figure 11:
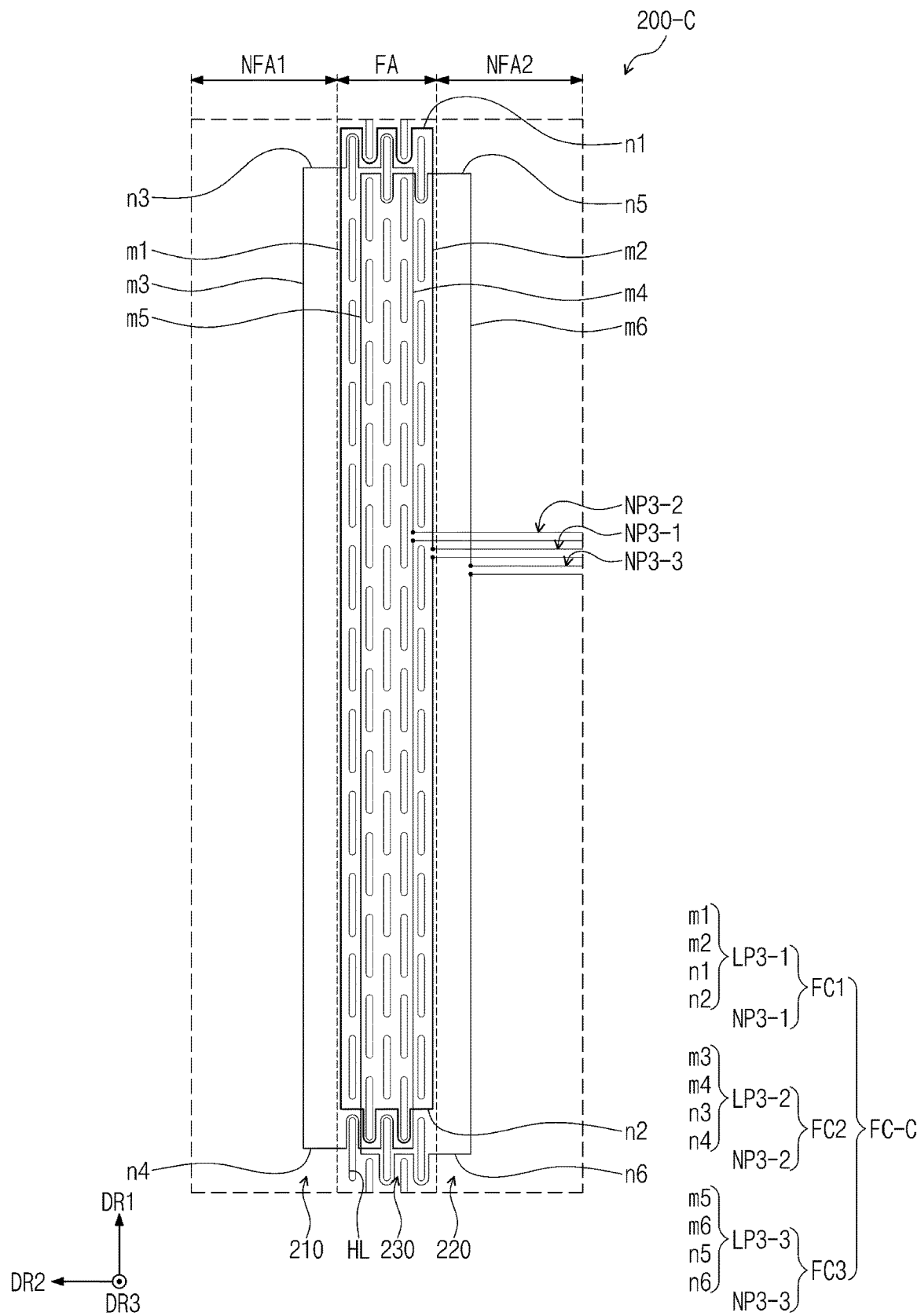

Referring to FIG. 11, in a digitizer 200-C according to an embodiment, folding coils FC-C may include first to third folding coils FC1, FC2, and FC3. Compared to the folding coils of FIG. 10, the fourth sub long side m4 may be disposed more adjacent to the second non-folding portion 220 than the fifth sub long side m5, and the fifth sub long side m5 may be disposed more adjacent to the first non-folding portion 210 than the fourth sub long side m4, so that the second folding coil FC2 and the third folding coil FC3 may be disposed to overlap each other in the folding portion 230.

Figure 12:
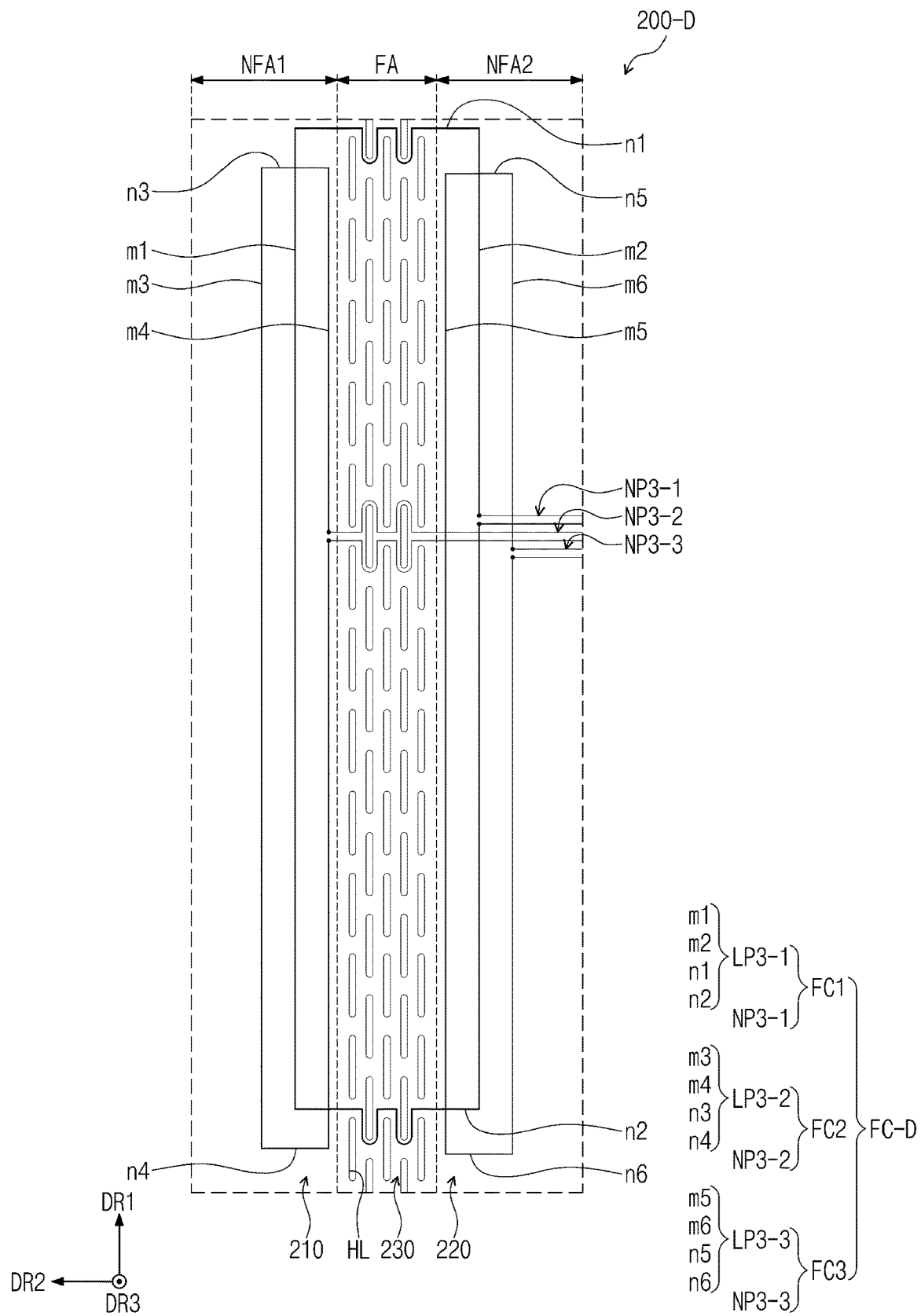

Referring to FIG. 12, in a digitizer 200-D according to an embodiment, folding coils FC-D may include first to third folding coils FC1, FC2, and FC3.

The first folding coil FC1 according to an embodiment may be disposed in the first non-folding portion 210, the folding portion 230, and the second non-folding portion 220. The first sub long side m1 may be disposed on the first non-folding portion 210 and the second sub long side m2 may be disposed on the second non-folding portion 220.

The second folding coil FC2 according to an embodiment may be disposed in the first non-folding portion 210. The third sub long side m3 and the fourth sub long side m4 of the second folding coil FC2 may all be disposed in the first non-folding portion 210. The third sub long side m3 may be disposed in the inner side of the first non-folding portion 210 more than the first sub long side m1, and the fourth sub long side m4 may be disposed more adjacent to the folding portion 230 more than the first sub long side m1.

According to an embodiment, the third sub short side n3 and the fourth sub short side n4 of the second folding coil FC2 are all be disposed only in the first non-folding portion 210 and are not disposed in the folding portion 230, so that the third and fourth sub-short sides n3 and n4 may include no curved portions because they need not to pass through between the holes HL.

The third folding coil FC3 according to an embodiment may be disposed in the second non-folding portion 220. The fifth sub long side m5 and the sixth sub long side m6 of the third folding coil FC3 may all be disposed in the second non-folding portion 220. The fifth sub long side m5 may be disposed more adjacent to the folding portion 230 than the second sub long side m2, and the sixth sub long side m6 may be disposed in the inner side of the second non-folding portion 220 more than the second sub long side m2.

According to an embodiment, the fifth sub short side n5 and the sixth sub short side n6 of the third folding coil FC3 are all be disposed only in the second non-folding portion 220 and are not disposed in the folding portion 230, so that the fifth and sixth sub short sides n5 and n6 may include no curved portions because they need not to pass through between the holes HL.

Figure 13A:
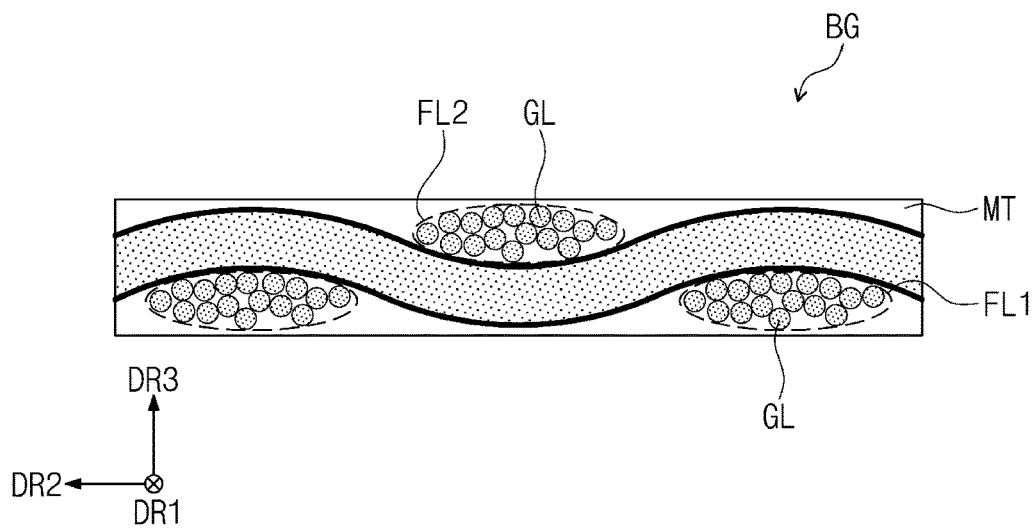
FIG. 13A is a schematic cross-sectional view of a base layer according to an embodiment.
Figure 13B:
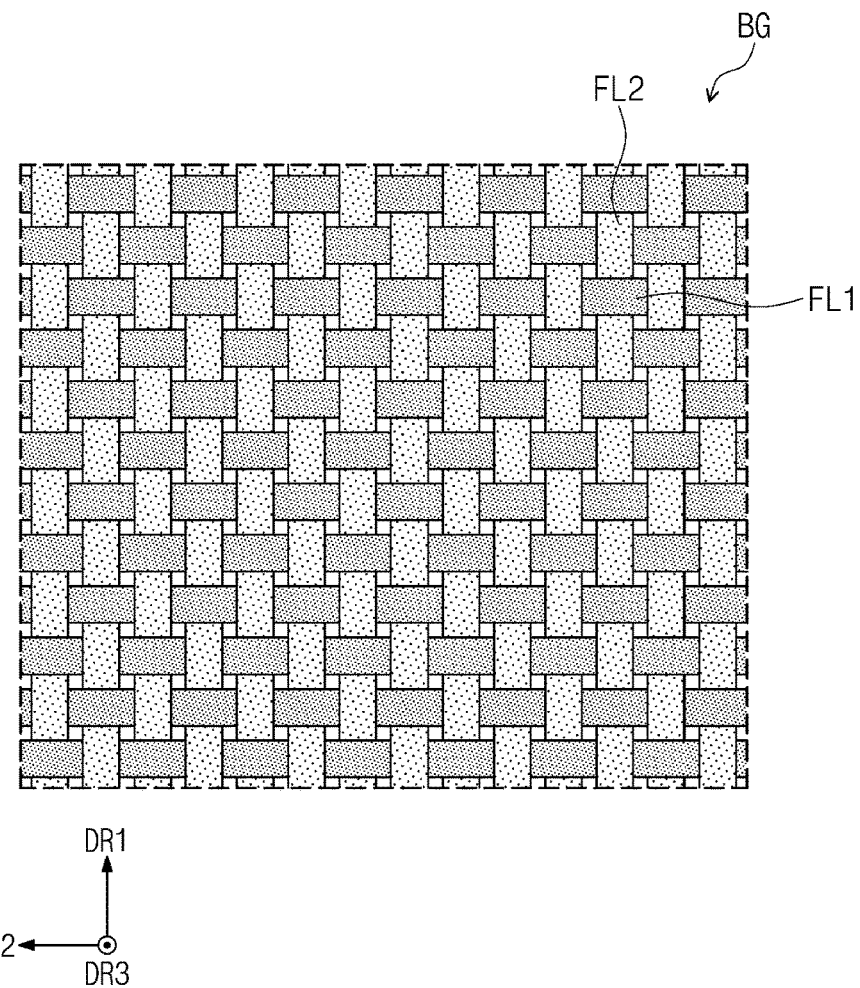
FIG. 13B is a schematic plan view of a base layer according to an embodiment.

FIG. 13A is a schematic cross-sectional view of a base layer included in a digitizer according to an embodiment. FIG. 13B is a schematic plan view of a base layer included in the digitizer according to an embodiment. The description of the base layer BG to be described with reference to FIGS. 13A and 13B may be applied to the base layer BG and the cover layers IL1, IL2, and IL3 described in FIG. 4.

Referring to FIGS. 13A and 13B, the base layer BG according to the disclosure may include a matrix MT including a filler and fiber lines FL1 and FL2 disposed within the matrix MT.

The fiber lines FL1 and FL2 may be alternately arranged or disposed in the first and second directions DR1 and DR2 to have a fabric shape or a fabric pattern on a plane. Each of the fiber lines FL1 and FL2 may be provided in a bundle form in which fibers GL are gathered. The diameter of one fiber (GL) included in one fiber line may fall within a range of about 3 μm to about 10 μm.

Each of the fiber lines FL1 and FL2 may include a reinforced fiber composite material. The reinforced fiber composite material may be any one of carbon fiber-reinforced plastics (CFRP) and glass fiber-reinforced plastic (GFRP). The fiber lines FL1 and FL2 may be disposed within the matrix MT. The matrix MT according to an embodiment may include at least one of epoxy, polyester, polyamides, polycarbonates, polypropylene, polybutylene, and vinyl ester.

The matrix MT may include a filler. The filler may include at least one of silica, barium sulphate, sintered TALC, barium titanate, titanium oxide, CLAY, alumina, mica, boehmite, zinc borate, and zinc tin oxide.

According to the disclosure, the base layer BG included in the digitizer 200 (see FIG. 3) may include a fiber bundle of glass fiber-reinforced plastic or carbon fiber-reinforced plastic disposed within the matrix MT to protect the lower portion of the electronic device ED (see FIG. 3) in case that the electronic device ED is folded.

Therefore, the digitizer 200 (see FIG. 3) of the disclosure may have a configuration serving as a protection member and simultaneously having a function of detecting a pen. Accordingly, it is possible to omit a separate metal plate protecting the electronic device ED (see FIG. 3), thereby reducing cost and providing a slim electronic device ED (see FIG. 3).

According to the disclosure, it is possible to independently drive the sensing coils for sensing the folding area. Accordingly, sensing sensitivity in the folding area may be improved. It is possible to solve design restrictions of sensing coils in a folding area with space restrictions by including holes to improve folding characteristics.

Although the disclosure has been described with reference to embodiments, it will be understood that the disclosure can be variously modified and changed by those skilled in the art or those having ordinary skill in the art without deviating from the spirit and technical scope of the disclosure and as described in the claims to be described later. Therefore, the technical scope of the disclosure is not limited to the contents described in the detailed description of the specification, but should also be defined by the claims.

While the disclosure has been described with reference to embodiments thereof, it will be apparent to those of ordinary skill in the art that various changes and modifications may be made thereto without departing from the spirit and scope of the disclosure and as set forth in the following claims.

What is claimed is:

1. An electronic device comprising:
    a display panel including:
        a folding area to be folded along a folding axis extending in a first direction; and
        a first non-folding area and a second non-folding area spaced apart from each other in a second direction intersecting the first direction with the folding area disposed between the first non-folding area and the second non-folding area;
    a digitizer including:
        a first non-folding portion at least partially overlapping the first non-folding area in a plan view;
        a second non-folding portion at least partially overlapping the second non-folding area, in a plan view; and
        a folding portion at least partially overlapping the folding area in a plan view, connecting the first non-folding portion and the second non-folding portion and including holes, including first loop coils disposed in the first direction and second loop coils disposed in the second direction and insulated from and intersecting with the first loop coils, and disposed below the display panel, wherein
    the second loop coils include:
        non-folding coils respectively disposed in the first non-folding portion and the second non-folding portion; and
        folding coils, at least one of the folding coils being disposed in the folding portion,
    the non-folding coils are driven in a first mode, and
    the folding coils are driven in a second mode different from the first mode.

2. The electronic device of claim 1, wherein the folding coils include:
    a first folding coil at least partially overlapping the folding area in a plan view and driven in a multi-channel;
    a second folding coil at least partially overlapping the first non-folding area in a plan view and insulated from and intersecting with the first folding coil; and
    a third folding coil at least partially overlapping the second non-folding area in a plan view and insulated from and intersecting with the first folding coil, wherein
    the first folding coil and the second folding coil are driven as one first channel, and
    the first folding coil and the third folding coil are driven as a second channel different from the first channel.

3. The electronic device of claim 2, wherein
    the first folding coil is configured to output a pre-sensing signal,
    the second loop coils are configured to receive a mode determination signal for selecting one of the first mode and the second mode based on the pre-sensing signal, the mode determination signal is selected as the first mode in case that an input in the first folding coil is not detected through the pre-sensing signal, and
    the mode determination signal is selected as the second mode in case that an input in the first folding coil is detected through the pre-sensing signal.

4. The electronic device of claim 1, wherein the first loop coils are driven in both the first mode and the second mode.

5. The electronic device of claim 1, wherein
    each of the non-folding coils includes an open loop wound twice, and
    each of the folding coils includes an open loop wound once.

6. The electronic device of claim 1, wherein
    the holes include a first group hole and a second group hole each extending in the first direction and spaced apart from each other along the second direction, and
    the second group hole is shifted from the first group hole by a selectable distance in the first direction.

7. The electronic device of claim 1, wherein the digitizer is configured to detect an external input using electromagnetic resonance.

8. The electronic device of claim 1, wherein the digitizer includes:
    a base layer;
    a first cover layer disposed on the base layer;
    a second cover layer disposed below the base layer; and
    a third cover layer disposed below the second cover layer.

9. The electronic device of claim 8, wherein
    each of the first loop coils includes a first coil portion and a first connection portion connecting the first coil portion and a connector,
    the first coil portion includes first long sides extending in the second direction and first short sides extending in the first direction,
    the first long sides are disposed on the base layer and covered by the first cover layer, and the first short sides are disposed below the base layer and covered by the second cover layer, and
    at least a portion of the first connection portion is disposed below the second cover layer and covered by the third cover layer.

10. The electronic device of claim 8, wherein
    each of the non-folding coils includes a second coil portion and a second connection portion connecting the second coil portion and a connector,
    the second coil portion includes second long sides extending in the first direction and second short sides extending in the second direction,
    the second long sides are disposed below the base layer and covered by the second cover layer, and the second short sides are disposed on the base layer and covered by the first cover layer, and
    at least a portion of the second connection portion is disposed below the second cover layer and covered by the third cover layer.

11. The electronic device of claim 8, wherein
    the folding coils include:
        a first folding coil at least partially overlapping the folding area in a plan view;
        a second folding coil at least partially overlapping the first non-folding area in a plan view and insulated from and intersecting with the first folding coil; and
        a third folding coil at least partially overlapping the second non-folding area in a plan view and insulated from and intersecting with the first folding coil, the first folding coil includes a 3-1-th coil portion including 3-1-th long sides extending in the first direction and 3-1-th short sides extending in the second direction, the second folding coil includes a 3-2-th coil portion including 3-2-th long sides extending in the first direction and 3-2-th short sides extending in the second direction, the third folding coil includes a 3-3-th coil portion including 3-3-th long sides extending in the first direction and 3-3-th short sides extending in the second direction, and the 3-1-th to 3-3-th long sides are disposed below the base layer and covered by the first cover layer, and the 3-1-th to 3-3-th short sides are disposed below the first cover layer and covered by the second cover layer.

12. The electronic device of claim 11, wherein the 3-1-th short sides are disposed between adjacent holes to cross the folding portion.

13. The electronic device of claim 11, wherein each of the 3-1-th long sides is disposed in the folding portion.

14. The electronic device of claim 11, wherein one of the 3-1-th long sides is disposed in the first non-folding portion, and another of the 3-1-th long sides is disposed in the second non-folding portion.

15. The electronic device of claim 11, wherein
one of the 3-2-th long sides is disposed in the first non-folding portion, and
one of the 3-3-th long sides is disposed in the second non-folding portion.

16. The electronic device of claim 15, wherein
another of the 3-2-th long sides is disposed in one of the folding portion and the second non-folding portion, and
another of the 3-3-th long sides is disposed in one of the folding portion and the first non-folding portion.

17. The electronic device of claim 16, wherein a portion of the 3-2-th short sides and a portion of the 3-3-th short sides are disposed between adjacent holes.

18. The electronic device of claim 15, wherein
one of the 3-2-th long sides is disposed in the first non-folding portion, and
the other of the 3-3-th long sides is disposed in the second non-folding portion.

19. The electronic device of claim 11, wherein
the first folding coil further includes a 3-1-th connection portion connecting the 3-1-th coil portion and a connector,
the second folding coil further includes a 3-2-th connection portion connecting the 3-2-th coil portion and the connector,
the third folding coil further includes a 3-3-th connection portion connecting the 3-3-th coil portion and the connector, and
at least a portion of each of the 3-1-th to 3-3-th connection portions is disposed below the second cover layer and covered by the third cover layer.

20. The electronic device of claim 8, wherein the holes are formed by penetrating from the first cover layer to the third cover layer.

21. The electronic device of claim 8, wherein the base layer includes a matrix including a filler and a reinforced fiber composite material disposed within the matrix and including any one of reinforced fibers and carbon fibers.

22. The electronic device of claim 21, wherein
the matrix includes at least one of epoxy, polyester, polyamides, polycarbonates, polypropylene, polybutylene, and vinyl ester, and the filler includes at least one of silica, barium sulphate, sintered talc, barium titanate, titanium oxide, clay, alumina, mica, boehmite, zinc borate, and zinc tin oxide.

23. An electronic device comprising:
a display panel including:
a folding area to be folded along a folding axis extending in a first direction; and
a first non-folding area and a second non-folding area spaced apart from each other in a second direction intersecting the first direction with the folding area disposed between the first non-folding area and the second non-folding area; and
a digitizer including first loop coils disposed in the first direction and second loop coils disposed in the second direction and insulated from and intersecting with the first loop coils, and having holes at least partially overlapping the folding area in a plan view, and disposed below the display panel, wherein
the second loop coils include:
non-folding coils including a first non-folding coil at least partially overlapping the first non-folding area in a plan view and a second non-folding coil at least partially overlapping the second non-folding area in a plan view; and
folding coils including:
a first folding coil at least partially overlapping the folding area in a plan view;
a second folding coil at least partially overlapping the first non-folding area in a plan view and insulated from and intersecting the first folding coil; and
a third folding coil at least partially overlapping the second non-folding area in a plan view and insulated from and intersecting the first folding coil,
each of the non-folding coils includes an open loop wound twice, and
each of the folding coils includes an open loop wound once.

24. The electronic device of claim 23, wherein
each of the first folding coil, the second folding coil, and the third folding coil includes:
a first sub long side and a second sub long side each extending in the first direction and facing each other in the second direction; and
a first sub short side and a second sub short side extending in the second direction, facing in the first direction, and connecting the first sub long side and the second sub long side, and
the first sub long side and the second sub long side and the first sub short side and the second sub short side are disposed on different layers.

25. The electronic device of claim 24, wherein
the non-folding coils include:
a first non-folding long side, a second non-folding long side, a third non-folding long side, a fourth non-folding long side and a fifth non-folding long side each extending in the first direction and disposed in the second direction; and
a first non-folding short side, a second non-folding short side, a third non-folding short side and a fourth non-folding short side each extending in the second direction and disposed in the first direction, and
the first non-folding long side, the first non-folding short side, the second non-folding long side, the second non-folding short side, the third non-folding long side, the third non-folding short side, the fourth non-folding long side, the fourth non-folding short side, and the fifth non-folding long side are sequentially connected.

26. The electronic device of claim 25, wherein
the first sub long side, the second sub long side, the first non-folding long side, the second non-folding long side, the third non-folding long side, the fourth non-folding long side and the fifth non-folding long side are disposed on a same layer, and
the first non-folding short side, the second non-folding short side, the third non-folding short side, and the fourth non-folding short side are disposed on different layers from the first sub short side and the second sub short side.

27. The electronic device of claim 26, wherein
the digitizer includes:
 a base layer;
 a first cover layer disposed on the base layer;
 a second cover layer disposed below the base layer; and
 a third cover layer disposed below the second cover layer,
the first sub long side and the second sub long side are disposed below the base layer and covered by the second cover layer,
the first sub short side and the second sub short side are disposed below the second cover layer and covered by the third cover layer, and
the first sub long side and the second sub long side are connected to the first sub short side and the second sub short side by contact holes passing through the second cover layer.

28. The electronic device of claim 27, wherein
the first non-folding long side, the second non-folding long side, the third non-folding long side, the fourth non-folding long side and the fifth non-folding long side are disposed below the base layer and covered by the second cover layer,
the first non-folding short side, the second non-folding short side, the third non-folding short side and the fourth non-folding short side are disposed on the base layer and covered by the first cover layer, and
and the first non-folding long side, the second non-folding long side, the third non-folding long side, the fourth non-folding long side and the fifth non-folding long side are connected to the first non-folding short side, the second non-folding short side, the third non-folding short side, and the fourth non-folding short side by contact holes passing through the base layer.

29. The electronic device of claim 23, wherein the digitizer is driven in a first mode and a second mode, and
the first loop coils and the non-folding coils output a sensing signal in the first mode, and the first loop coils and the folding coils output a sensing signal in the second mode.

30. The electronic device of claim 23, wherein
the first folding coil is driven in a multi-channel,
the first folding coil and the second folding coil are driven as a first channel; and
the first folding coil and the third folding coil are driven as a second channel different from the first channel.

* * * * *